United States Patent
Zhang et al.

(10) Patent No.: US 11,579,407 B2
(45) Date of Patent: Feb. 14, 2023

(54) OPTICAL IMAGING LENS ASSEMBLY

(71) Applicant: Zhejiang Sunny Optical Co., Ltd, Ningbo (CN)

(72) Inventors: Kaiyuan Zhang, Ningbo (CN); Yi Zhang, Ningbo (CN); Fujian Dai, Ningbo (CN); Liefeng Zhao, Ningbo (CN)

(73) Assignee: Zhejiang Sunny Optical Co., Ltd.

( * ) Notice: Subject to any disclaimer, the term of this patent is extended or adjusted under 35 U.S.C. 154(b) by 121 days.

(21) Appl. No.: 17/007,655

(22) Filed: Aug. 31, 2020

(65) Prior Publication Data
US 2021/0080696 A1    Mar. 18, 2021

(30) Foreign Application Priority Data

Sep. 17, 2019   (CN) .......................... 201910875428.3

(51) Int. Cl.
*G02B 13/00* (2006.01)
*G02B 9/12* (2006.01)

(52) U.S. Cl.
CPC ........... *G02B 13/0035* (2013.01); *G02B 9/12* (2013.01)

(58) Field of Classification Search
CPC .............................. G02B 13/0035; G02B 9/12
USPC ......................................... 359/708, 716, 784
See application file for complete search history.

(56) References Cited

U.S. PATENT DOCUMENTS

| | | | | |
|---|---|---|---|---|
| 3,877,792 A * | 4/1975 | Cox | .......... | G02B 9/12 359/716 |
| 4,109,995 A * | 8/1978 | Betensky | .......... | G02B 9/16 359/716 |
| 5,606,461 A * | 2/1997 | Ohshita | .......... | G02B 13/18 359/716 |
| 5,615,051 A * | 3/1997 | Takato | .......... | G02B 9/16 359/716 |
| 6,259,570 B1 * | 7/2001 | Noda | .......... | G02B 15/143105 359/716 |
| 7,042,656 B2 * | 5/2006 | Chen | .......... | G02B 13/06 359/716 |
| 7,095,571 B2 * | 8/2006 | Lee | .......... | G02B 9/12 359/716 |
| 9,759,889 B1 * | 9/2017 | Tang | .......... | G02B 13/0035 |
| 2011/0096221 A1 | 4/2011 | Tsai | | |
| 2011/0228157 A1 * | 9/2011 | Tang | .......... | G02B 9/12 359/716 |
| 2012/0002303 A1 * | 1/2012 | Shih | .......... | G02B 13/0035 359/716 |

(Continued)

OTHER PUBLICATIONS

First Examination Report for Application No. 202014038244 dated Jan. 7, 2022, 6 pages.

*Primary Examiner* — James R Greece

(74) *Attorney, Agent, or Firm* — Barnes & Thornburg LLP

(57) ABSTRACT

The present disclosure provides an optical imaging lens assembly including, sequentially from an object side to an image side along an optical axis, a first lens having refractive power; a second lens having refractive power; and a third lens having refractive power. A distance BFL along the optical axis from an image-side surface of the third lens of the optical imaging lens assembly to an imaging plane of the optical imaging lens assembly and a distance Td along the optical axis from an object-side surface of the first lens to the image-side surface of the third lens satisfy: $4.5 \leq BFL/Td \leq 7.0$.

19 Claims, 15 Drawing Sheets

(56) References Cited

U.S. PATENT DOCUMENTS

| | | | |
|---|---|---|---|
| 2013/0141801 A1* | 6/2013 | Yun | G02B 9/12 |
| | | | 359/716 |
| 2014/0327976 A1* | 11/2014 | Chen | G02B 13/0035 |
| | | | 359/716 |
| 2016/0116713 A1* | 4/2016 | Hsu | G02B 13/0035 |
| | | | 359/716 |
| 2016/0227082 A1 | 8/2016 | Hsueh et al. | |
| 2017/0115470 A1* | 4/2017 | Liao | G02B 9/60 |
| 2019/0049696 A1* | 2/2019 | Bone | G02B 13/02 |

\* cited by examiner

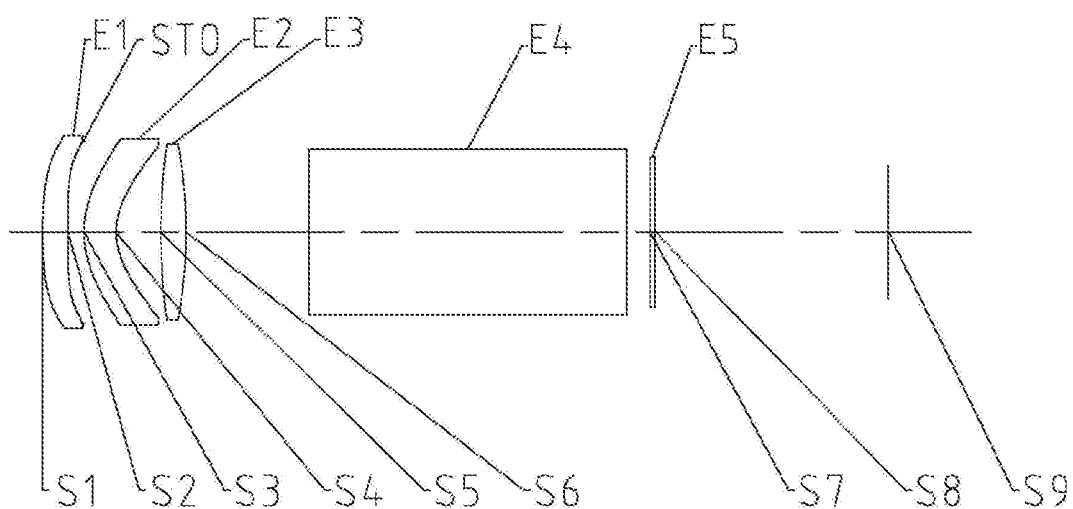
Fig. 1
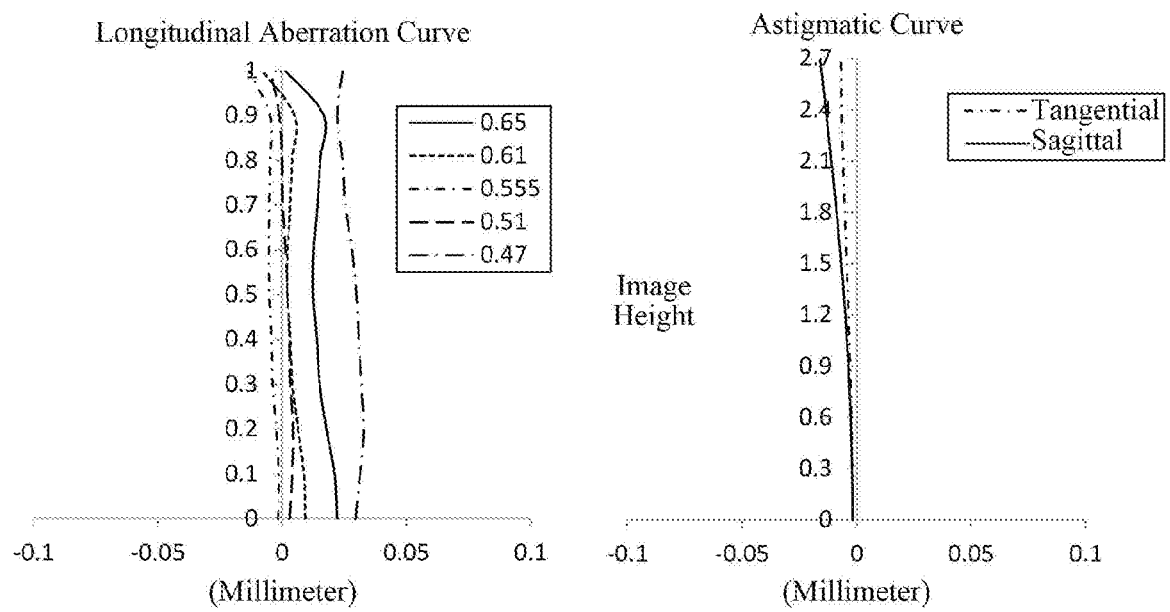
Fig. 2A
Fig. 2B

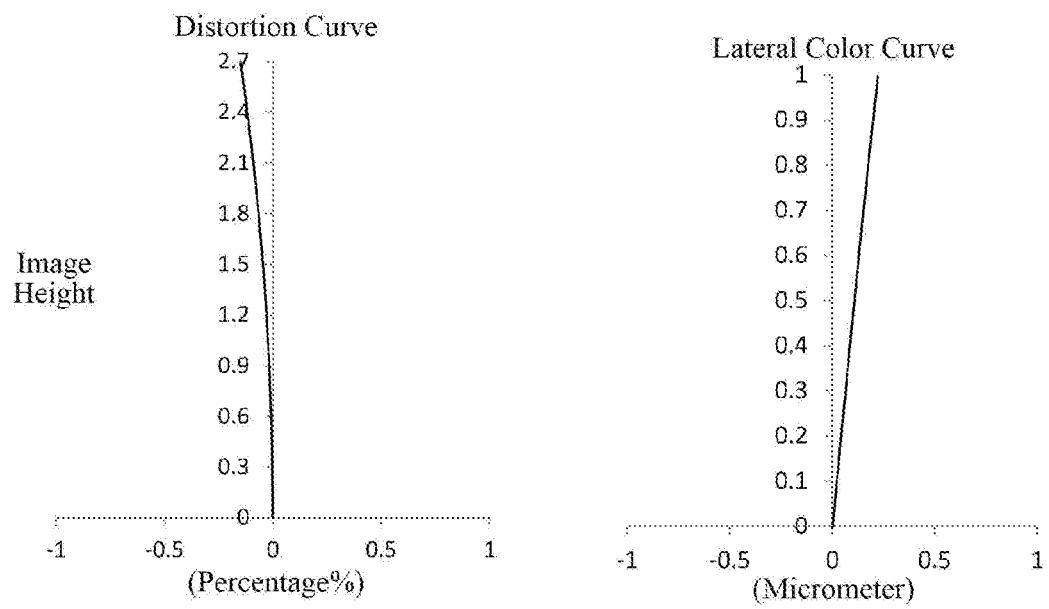
Fig. 6C
Fig. 6D
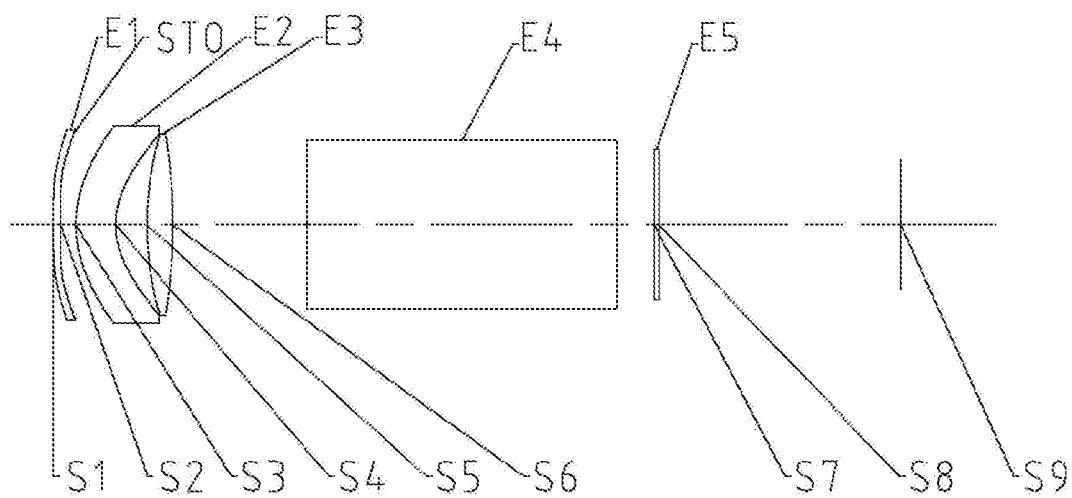
Fig. 7

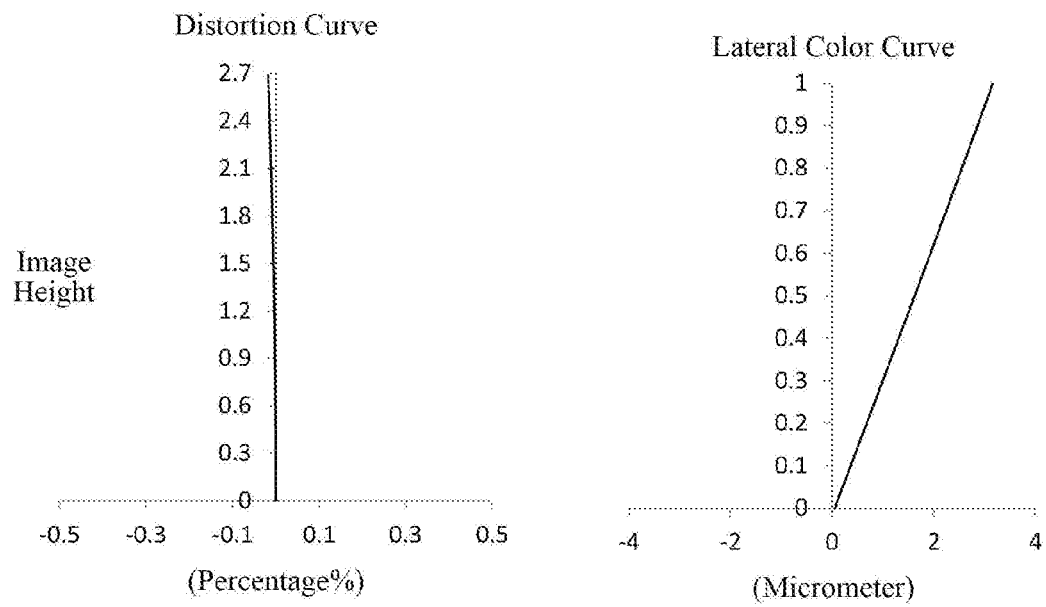
Fig. 10C
Fig. 10D
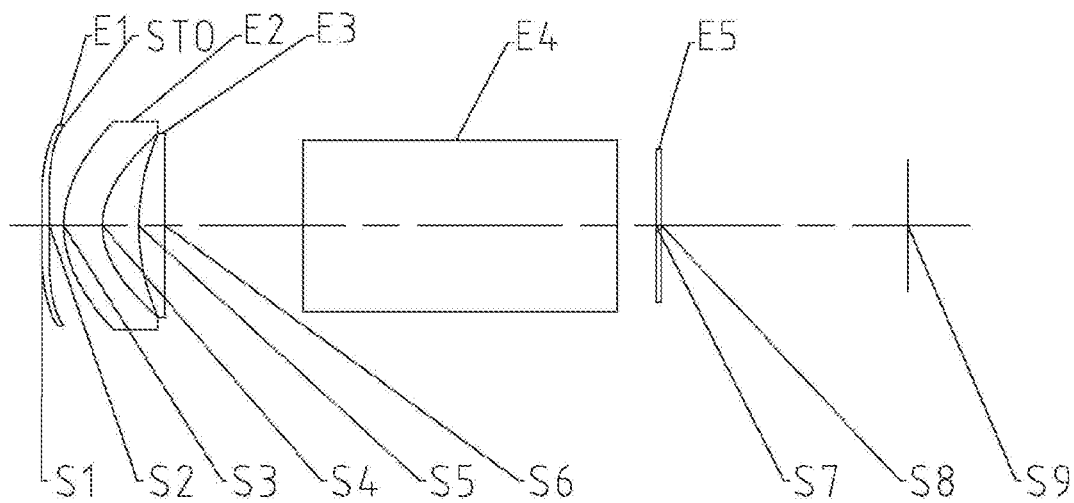
Fig. 11

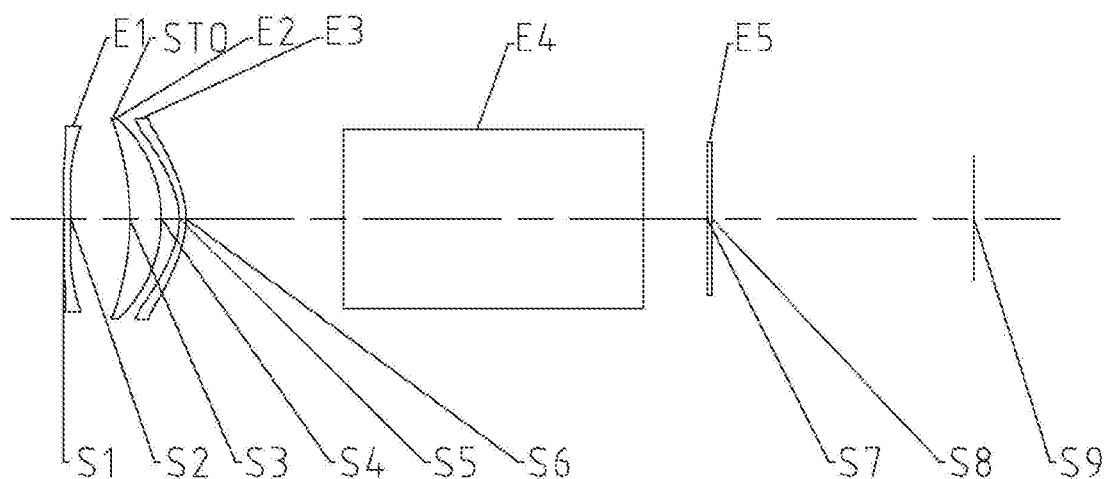
Fig. 13
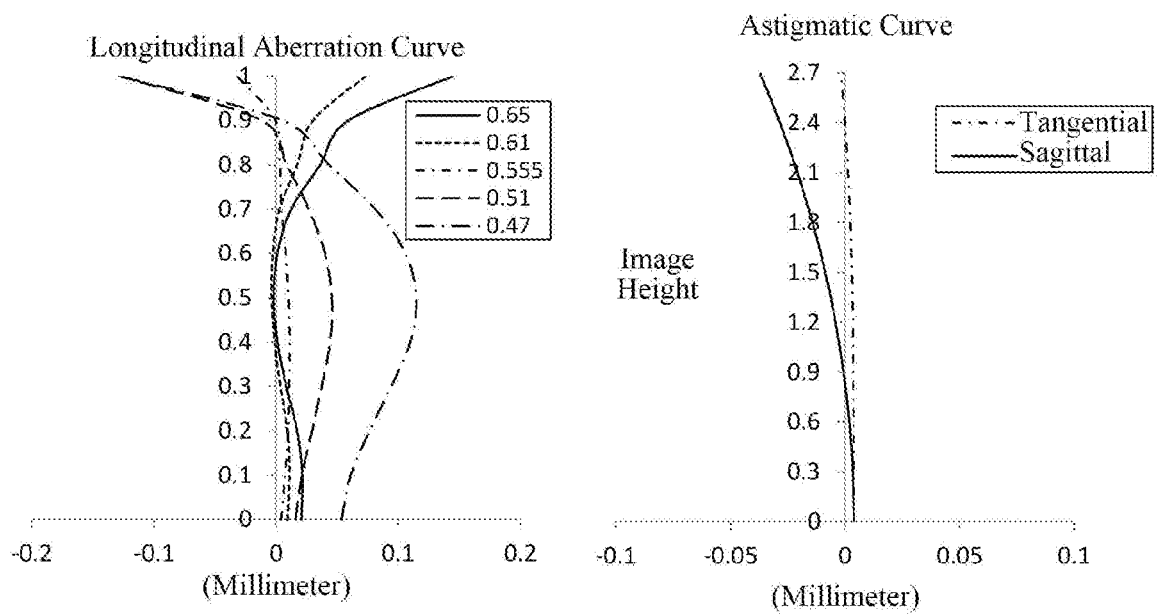
Fig. 14A
Fig. 14B

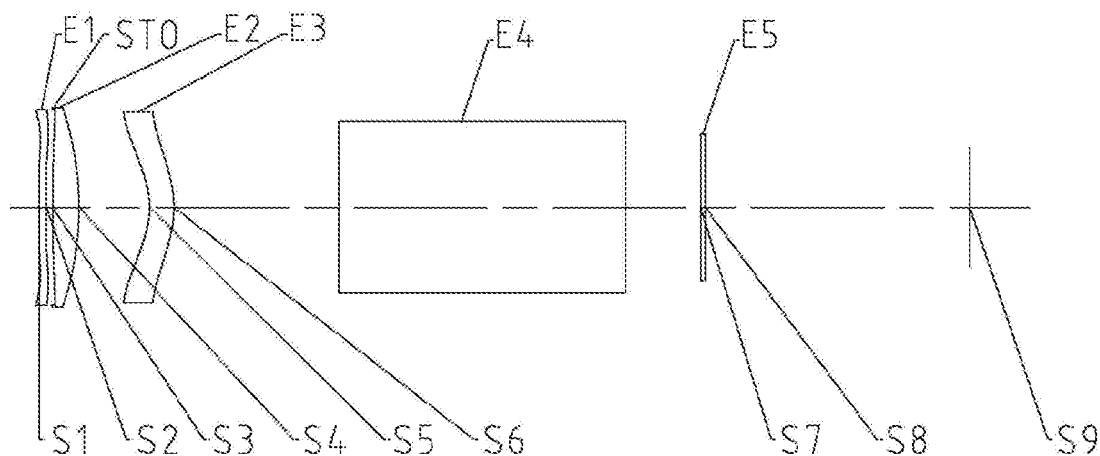
Fig. 17
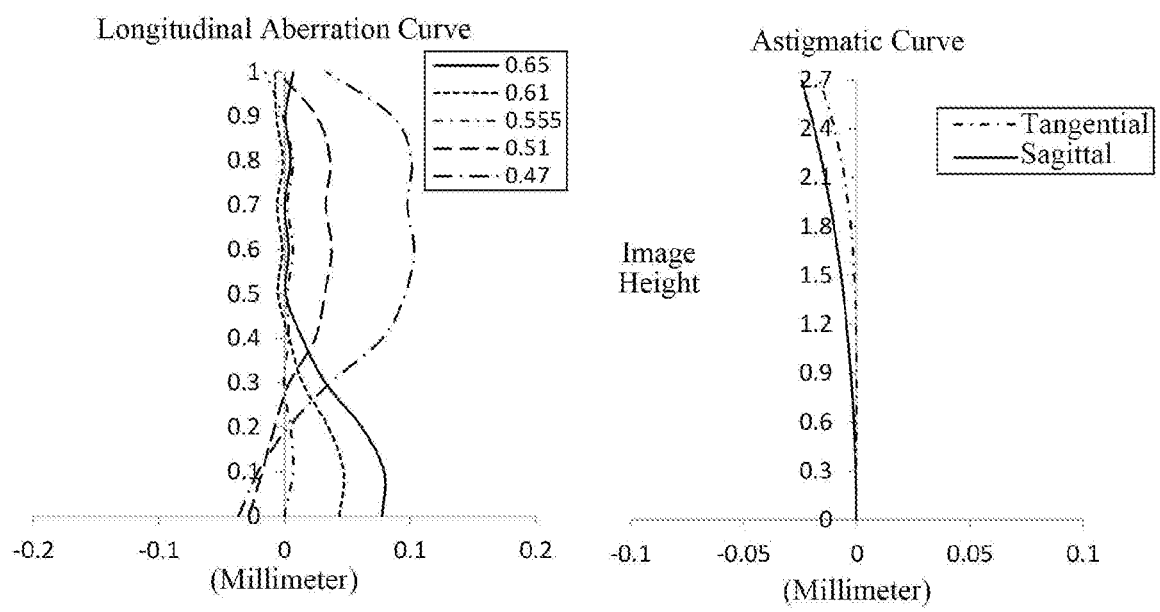
Fig. 18A
Fig. 18B

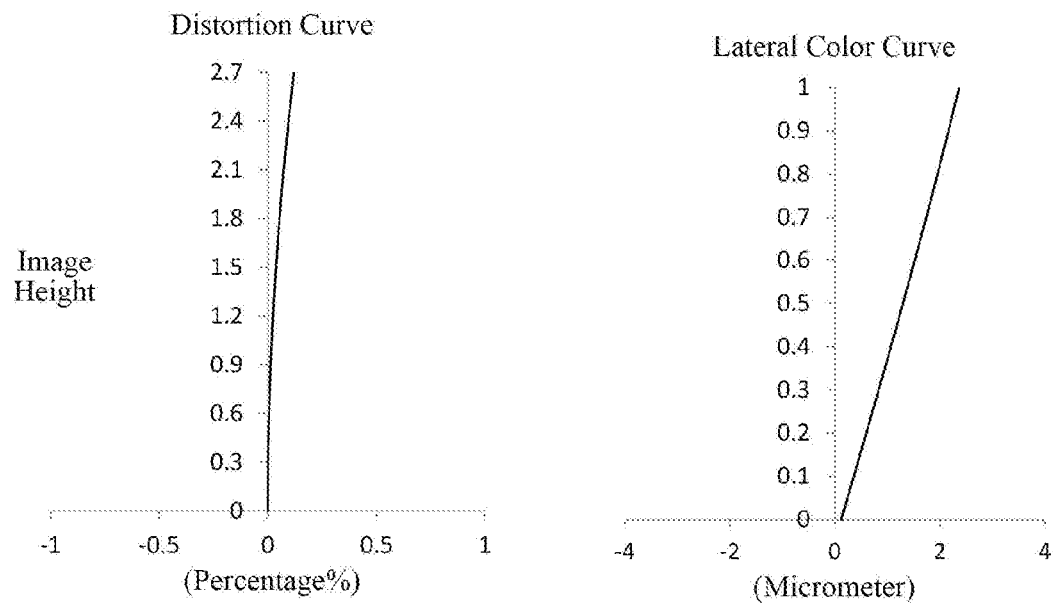
Fig. 18C
Fig. 18D
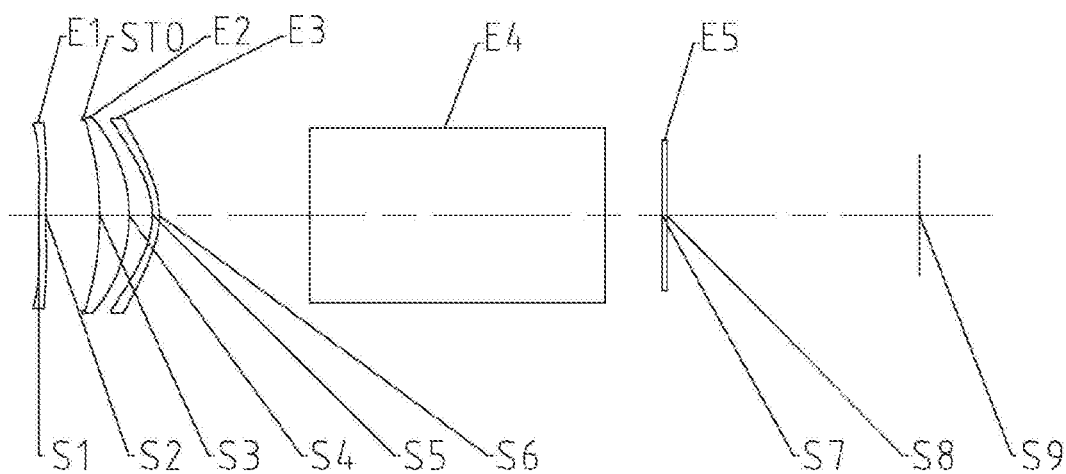
Fig. 19

OPTICAL IMAGING LENS ASSEMBLY

CROSS-REFERENCE TO RELATED APPLICATION

This application claims benefit of priority to Chinese Patent Application No. 201910875428.3 filed on Sep. 17, 2019 before the China National Intellectual Property Administration, the entire disclosure of which is incorporated herein by reference in its entity.

TECHNICAL FIELD

The present disclosure relates to the field of optical elements, and specifically, relates to an optical imaging lens assembly.

BACKGROUND

In recent years, with the popularization of the portable electronic products, such as mobile phones and tablet computers, the camera functions of the portable electronic products have been widely used. In particular, the ability to achieve multi-scenario shooting in different environments has become a common demand for the camera functions. Long-distance high-definition shooting is a relatively keen shooting method in some shooting scenes. At the same time, in order to obtain a good shooting effect, the optical imaging lens assembly in the capture device is required to have a telephoto feature and the like.

SUMMARY

In one aspect, the present disclosure provides an optical imaging lens assembly which includes, sequentially from an object side to an image side along an optical axis, a first lens having refractive power; a second lens having refractive power; and a third lens having refractive power.

In one embodiment, a distance BFL along the optical axis from an image-side surface of the third lens of the optical imaging lens assembly to an imaging plane of the optical imaging lens assembly and a distance Td along the optical axis from an object-side surface of the first lens to the image-side surface of the third lens satisfy: $4.5 \leq BFL/Td \leq 7.0$.

In one embodiment, an Abbe number V2 of the second lens and an Abbe number V3 of the third lens satisfy: $|V2-V3|>35$.

In one embodiment, a maximum field-of-view FOV of the optical imaging lens assembly satisfies: $TAN(FOV)<0.4$.

In one embodiment, an entrance pupil diameter EPD of the optical imaging lens assembly and half of a diagonal length ImgH of an effective pixel area on an imaging plane of the optical imaging lens assembly satisfy: $2.5<EPD/ImgH<3.5$.

In one embodiment, a maximum effective radius DT11 of an object-side surface of the first lens and a maximum effective radius DT32 of an image-side surface of the third lens satisfy: $0.9 \leq DT11/DT32 \leq 1.2$.

In one embodiment, an effective focal length f2 of the second lens and an effective focal length f3 of the third lens satisfy: $-2.5<f2/f3<0$.

In one embodiment, a total effective focal length f of the optical imaging lens assembly and an effective focal length f1 of the first lens satisfy: $f/|f1|<1.0$.

In one embodiment, a refractive index N2 of the second lens and a refractive index N3 of the third lens satisfy: $|N2-N3|<0.1$.

In one embodiment, a radius of curvature R4 of an image-side surface of the second lens and a radius of curvature R5 of an object-side surface of the third lens satisfy: $0<R4/R5<4$.

In one embodiment, a spaced interval T12 between the first lens and the second lens along the optical axis, a spaced interval T23 between the second lens and the third lens along the optical axis and a distance Td along the optical axis from an object-side surface of the first lens to an image-side surface of the third lens satisfy: $(T12+T23)/Td<1.0$.

In one embodiment, a total effective focal length f of the optical imaging lens assembly and an entrance pupil diameter EPD of the optical imaging lens assembly satisfy: $3.0<f/EPD<4.5$.

In one embodiment, at least one of the first lens to the third lens is a glass lens.

In one embodiment, the optical imaging lens assembly further includes a prism disposed between an image-side surface of the third lens and an imaging plane of the optical imaging lens assembly.

The optical imaging lens assembly provided in the present disclosure employs a plurality of lenses, including the first lens to the third lens. By reasonably setting the proportional relationship between the distance along the optical axis from the image-side surface of the third lens of the optical imaging lens assembly to the imaging plane of the optical imaging lens assembly and the distance along the optical axis from the object-side surface of the first lens to the image-side surface of the third lens, the telephoto characteristic of the optical imaging lens assembly is achieved.

BRIEF DESCRIPTION OF THE DRAWINGS

Other features, objects, and advantages of the present disclosure will become more apparent from the following detailed description of the non-limiting embodiments with reference to the accompanying drawings. In the drawings:

FIG. 1 illustrates a schematic structural view of an optical imaging lens assembly according to example 1 of the present disclosure;

FIGS. 2A to 2D illustrate a longitudinal aberration curve, an astigmatic curve, a distortion curve, and a lateral color curve of the optical imaging lens assembly of the example 1, respectively;

FIGS. 6A to 6D illustrate a longitudinal aberration curve, an astigmatic curve, a distortion curve, and a lateral color curve of the optical imaging lens assembly of the example 3, respectively;

FIG. 7 illustrates a schematic structural view of an optical imaging lens assembly according to example 4 of the present disclosure;

FIGS. 10A to 10D illustrate a longitudinal aberration curve, an astigmatic curve, a distortion curve, and a lateral color curve of the optical imaging lens assembly of the example 5, respectively;

FIG. 11 illustrates a schematic structural view of an optical imaging lens assembly according to example 6 of the present disclosure;

FIG. 13 illustrates a schematic structural view of an optical imaging lens assembly according to example 7 of the present disclosure;

FIGS. 14A to 14D illustrate a longitudinal aberration curve, an astigmatic curve, a distortion curve, and a lateral color curve of the optical imaging lens assembly of the example 7, respectively;

FIG. 17 illustrates a schematic structural view of an optical imaging lens assembly according to example 9 of the present disclosure;

FIGS. 18A to 18D illustrate a longitudinal aberration curve, an astigmatic curve, a distortion curve, and a lateral color curve of the optical imaging lens assembly of the example 9, respectively;

FIG. 19 illustrates a schematic structural view of an optical imaging lens assembly according to example 10 of the present disclosure.

DETAILED DESCRIPTION OF EMBODIMENTS

Figures 2C, 2D:
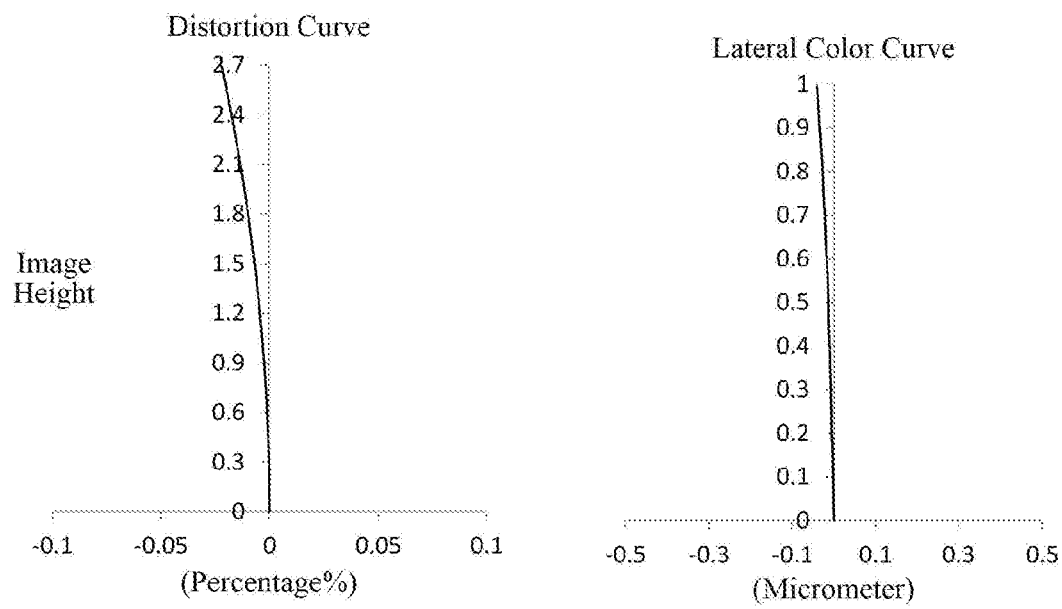

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens assembly according to an exemplary embodiment of the present disclosure may include three lenses having refractive power, which are a first lens, a second lens and a third lens. The three lenses are arranged sequentially from an object side to an image side along an optical axis.

In an exemplary embodiment, the first lens may have positive or negative refractive power, an object-side surface thereof is a convex or a concave surface, and an image-side surface thereof is a convex or a concave surface; the second lens may have positive or negative refractive power, an object-side surface thereof is a convex or a concave surface, and an image-side surface thereof is a convex or a concave surface; and the third lens may have positive or negative refractive power, an object-side surface thereof is a convex or a concave surface, and an image-side surface thereof is a convex or a concave surface. A distance BFL along the optical axis from an image-side surface of the third lens of the optical imaging lens assembly to an imaging plane of the optical imaging lens assembly and a distance Td along the optical axis from an object-side surface of the first lens to the image-side surface of the third lens satisfy: $4.5 \leq \text{BFL}/\text{Td} \leq 7.0$, for example, $4.9 \leq \text{BFL}/\text{Td} \leq 7.0$. By reasonably setting the proportional relationship between the distance along the optical axis from the image-side surface of the third lens of the optical imaging lens assembly to the imaging plane of the optical imaging lens assembly and the distance along the optical axis from the object-side surface of the first lens to the image-side surface of the third lens, it is not only beneficial to achieve the ultra-telephoto performance of the optical imaging lens assembly, but also beneficial to achieve the miniaturization of the lens assembly.

In an exemplary embodiment, an Abbe number V2 of the second lens and an Abbe number V3 of the third lens satisfy: $|V2-V3|>35$, for example, $40>|V2-V3|>35$. The Abbe numbers of the second lens and the third lens are quite difference, which is beneficial to correcting the vertical chromatic aberration, axial chromatic aberration and spherical aberration of the optical system, thereby improving the image quality of the system.

In an exemplary embodiment, a maximum field-of-view FOV of the optical imaging lens assembly satisfies: $\text{TAN}(\text{FOV})<0.4$, for example, $0.15<\text{TAN}(\text{FOV})<0.4$. Setting the optical imaging lens assembly to have a smaller maximum field-of-view is beneficial to obtaining a larger system focal length, so that the lens assembly meets the telephoto characteristics. The optical imaging lens assembly with telephoto characteristics according to the present example may be used with a wide-angle lens having short focal length to achieve a larger optical zoom.

In an exemplary embodiment, an entrance pupil diameter EPD of the optical imaging lens assembly and half of a diagonal length ImgH of an effective pixel area on an imaging plane of the optical imaging lens assembly satisfy: $2.5<\text{EPD}/\text{ImgH}<3.5$. By setting the ratio of the entrance pupil diameter of the optical imaging lens assembly with respect to half of the diagonal length of the effective pixel area on the imaging plane of the optical imaging lens assembly to be within a reasonable value range, it is beneficial to achieve the miniaturization of the system while ensuring that the optical system has good image quality even in a dark environment.

In an exemplary embodiment, a maximum effective radius DT11 of an object-side surface of the first lens and a maximum effective radius DT32 of an image-side surface of the third lens satisfy: $0.9 \leq \text{DT11}/\text{DT32} \leq 1.2$. By reasonably setting the proportional relationship between the maximum effective radius of the object-side surface of the first lens and the maximum effective radius of the image-side surface of the third lens, it is beneficial to reduce the size of the front end of the lens assembly, thereby making the entire optical imaging lens assembly lighter and thinner. In addition, in this example, the above relationship setting is also beneficial to limiting the incident range of light, removing poor-quality light at the edge, reducing off-axis aberration, and effectively improving the resolution of the lens.

In an exemplary embodiment, an effective focal length f2 of the second lens and an effective focal length f3 of the third lens satisfy: $-2.5<f2/f3<0$. By setting the ratio of the effective focal length of the second lens to the effective focal length of the third lens to be within a reasonable value range, it is not only beneficial to control the residual spherical aberration after the compensation of the positive and negative spherical aberrations of the above two lenses in a smaller range, but also beneficial for the subsequent lens to compensate the residual spherical aberration, so that the image quality near the on-axis field-of-view of the optical system is easier guaranteed.

In an exemplary embodiment, a total effective focal length f of the optical imaging lens assembly and an effective focal length f1 of the first lens satisfy: $f/|f1|<1.0$. By reasonably setting the proportional relationship between the total effective focal length of the optical imaging lens assembly and the effective focal length of the first lens, the refractive power of the first lens may be effectively controlled, which is beneficial to reasonably control the contribution of the first lens to the spherical aberration and the direction thereof. Most of the third-order spherical aberrations generated by the first lens are compensated so as to improve the image quality.

In an exemplary embodiment, a refractive index N2 of the second lens and a refractive index N3 of the third lens satisfy: $|N2-N3|<0.1$, for example, $|N2-N3|<0.05$. By reasonably controlling the difference between the refractive indexes of the second lens and the third lens, it is beneficial to distribute the refractive power of the system reasonably, and eliminate the temperature drift of the system while achieving a better image quality.

In an exemplary embodiment, a radius of curvature R4 of an image-side surface of the second lens and a radius of curvature R5 of an object-side surface of the third lens satisfy: $0<R4/R5<4$. By reasonably setting the proportional relationship between the radius of curvature of the image-side surface of the second lens and the radius of curvature of the object-side surface of the third lens, it is beneficial to constrain effectively the aberration contribution rate of the second lens and the third lens to compensate the aberrations related to the aperture in the system, thereby improving the image quality of the system.

In an exemplary embodiment, a spaced interval T12 between the first lens and the second lens along the optical axis, a spaced interval T23 between the second lens and the third lens along the optical axis and a distance Td along the optical axis from an object-side surface of the first lens to an image-side surface of the third lens satisfy: $(T12+T23)/Td<1.0$, for example, $0.3<(T12+T23)/Td<1.0$. By reasonably setting the relationship among the above three parameters and reasonably distributing the spaced interval between the lenses, it is beneficial to ensure the field curvature of the system, thereby obtaining a good image quality at the off-axis field of the system.

In an exemplary embodiment, a total effective focal length f of the optical imaging lens assembly and an entrance pupil diameter EPD of the optical imaging lens assembly satisfy: $3.0<f/\text{EPD}<4.5$. By reasonably setting the proportional relationship between the total effective focal length of the optical imaging lens assembly and the entrance pupil diameter of the optical imaging lens assembly, reasonably assigning refractive power of the system and constraining the entrance pupil diameter of the optical system, the F-number of the optical system with a large image plane is within a reasonable value range, which is not only beneficial for the optical system to have an imaging effect with a large aperture, but also beneficial for the optical system to have a good image quality even in a dark environment.

In an exemplary embodiment, at least one of the first to the third lenses is a glass lens. In the field of lens manufacturing, the range of the refractive index for various types of glass materials is large, so when choosing a material with a suitable refractive index, more choices may be made. When using glass material to make the lens, the performance of the lens assembly may be effectively improved, so that the lens obtains a good imaging effect. At the same time, the expansion coefficient of glass is smaller than that of plastic. Using the lens made of glass material in the system may better eliminate the temperature drift of the system.

In an exemplary embodiment, the optical imaging lens assembly further includes a prism disposed between the image-side surface of the third lens and the imaging plane of the optical imaging lens assembly. In this example, the prism may adjust the optical path, which is beneficial to reduce the length of the lens assembly while achieving the ultra-long focal length, thereby achieving the miniaturization of the lens assembly.

In an exemplary embodiment, the optical imaging lens assembly described above may further include a stop. The stop may be disposed at an appropriate position as needed, for example, between the first lens and the second lens. Optionally, the stop may be disposed close to the image-side surface of the first lens or may be disposed close to the object-side surface of the second lens. Optionally, the above optical imaging lens assembly may further include an optical filter for correcting the color deviation and/or a protective glass for protecting the photosensitive element located on an imaging plane.

In an exemplary embodiment, at least one of the surfaces of lenses is aspheric, that is, at least one of the object-side surface of the first lens to the image-side surface of the third lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, the object-side surface and the image-side surface of the first lens are aspheric.

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

Exemplary embodiments of the present disclosure further provide an electronic device including the imaging apparatus described above.

However, it will be understood by those skilled in the art that the number of lenses constituting the optical imaging lens assembly may be varied to achieve the various results and advantages described in this specification without departing from the technical solution claimed by the present disclosure. For example, although the embodiment is described by taking three lenses as an example, the optical imaging lens assembly is not limited to include three lenses. The optical imaging lens assembly may also include other numbers of lenses if desired.

Some specific examples of an optical imaging lens assembly applicable to the above embodiment will be further described below with reference to the accompanying drawings.

Example 1

An optical imaging lens assembly according to example 1 of the present disclosure is described below with reference to FIG. 1 to FIG. 2D. FIG. 1 is a schematic structural view of the optical imaging lens assembly according to example 1 of the present disclosure.

As shown in FIG. 1, the optical imaging lens assembly includes a first lens E1, a stop STO, a second lens E2, a third lens E3, a prism E4, an optical filter E5 and an imaging plane S9, which are sequentially arranged from an object side to an image side along an optical axis.

The first lens E1 has positive refractive power, an object-side surface S1 thereof is a convex surface, and an image-side surface S2 thereof is a convex surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The optical filter E5 has an object-side surface S7 and an image-side surface S8. Light from an object sequentially passes through the respective surfaces S1 to S8 and is finally imaged on the imaging plane S9.

Table 1 is a table illustrating basic parameters of the optical imaging lens assembly of example 1, wherein the units for the radius of curvature, the thickness/distance and the focal length are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 32.6788 | 1.0357 | 1.546 | 56.11 | 31.89 | 25.6401 |
| S2 | Aspheric | −36.8444 | 0.6190 | | | | −95.1310 |
| STO | Spherical | Infinite | 0.0286 | | | | |
| S3 | Aspheric | 4.0550 | 1.3161 | 1.666 | 20.40 | −19.60 | −3.4588 |
| S4 | Aspheric | 2.6931 | 1.8386 | | | | −1.1831 |
| S5 | Spherical | 26.5768 | 1.0355 | 1.642 | 60.20 | 17.48 | |
| S6 | Spherical | −19.1283 | 5.0396 | | | | |
| P | Spherical | Infinite | 13.0000 | 1.789 | 43.93 | | |
| | Spherical | Infinite | 0.9610 | | | | |
| S7 | Spherical | Infinite | 0.2100 | 1.517 | 64.17 | | |
| S8 | Spherical | Infinite | 9.5474 | | | | |
| S9 | Spherical | Infinite | | | | | |

In this example, a total effective focal length f of the optical imaging lens assembly is 27.50 mm, and a maximum field-of-view FOV of the optical imaging lens assembly is 11.3°.

The object-side surface and the image-side surface of one of the first lens E1 and the second lens E2 are aspheric. The surface shape x of each aspheric lens may be defined by using, but not limited to, the following aspheric formula:

$$x = \frac{ch^2}{1+\sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. In example 1, the object-side surface and the image-side surface of the first lens and the second lens are aspheric. Table 2 below shows high-order coefficients A4, A6, A8, A10, A12, A14, A16, A18 and A20 applicable to each aspheric surface S1 to S4 in example 1.

TABLE 2

| Surface number | A4 | A6 | A8 | A10 | A12 |
|---|---|---|---|---|---|
| S1 | 3.5767E−03 | −6.4803E−05 | −1.4390E−05 | 3.2190E−06 | −3.1641E−07 |
| S2 | 5.9695E−03 | −1.4415E−04 | −4.3665E−05 | 1.1941E−05 | −1.4866E−06 |
| S3 | 3.0375E−03 | −2.0078E−04 | −3.3157E−05 | 1.1404E−05 | −1.5672E−06 |
| S4 | −5.3202E−03 | 6.8665E−04 | −1.5604E−04 | 3.2836E−05 | −4.8406E−06 |

| Surface number | A14 | A16 | A18 | A20 |
|---|---|---|---|---|
| S1 | 1.6087E−08 | −3.5530E−10 | −3.1181E−13 | 8.9900E−14 |
| S2 | 1.0555E−07 | −4.3430E−09 | 9.7517E−11 | −9.7195E−13 |
| S3 | 1.2074E−07 | −5.3357E−09 | 1.2519E−10 | −1.2018E−12 |
| S4 | 4.6070E−07 | −2.6843E−08 | 8.6993E−10 | −1.2039E−11 |

FIG. 2A illustrates a longitudinal aberration curve of the optical imaging lens assembly according to example 1, representing deviations of focal points converged by light of different wavelengths after passing through the lens assembly. FIG. 2B illustrates an astigmatic curve of the optical imaging lens assembly according to example 1, representing a curvature of a tangential plane and a curvature of a sagittal plane. FIG. 2C illustrates a distortion curve of the optical imaging lens assembly according to example 1, representing amounts of distortion corresponding to different image heights. FIG. 2D illustrates a lateral color curve of the optical imaging lens assembly according to example 1, representing deviations of different image heights on an imaging plane after light passes through the lens assembly. It can be seen from FIG. 2A to FIG. 2D that the optical imaging lens assembly provided in example 1 may achieve good image quality.

Example 2

Figure 3:
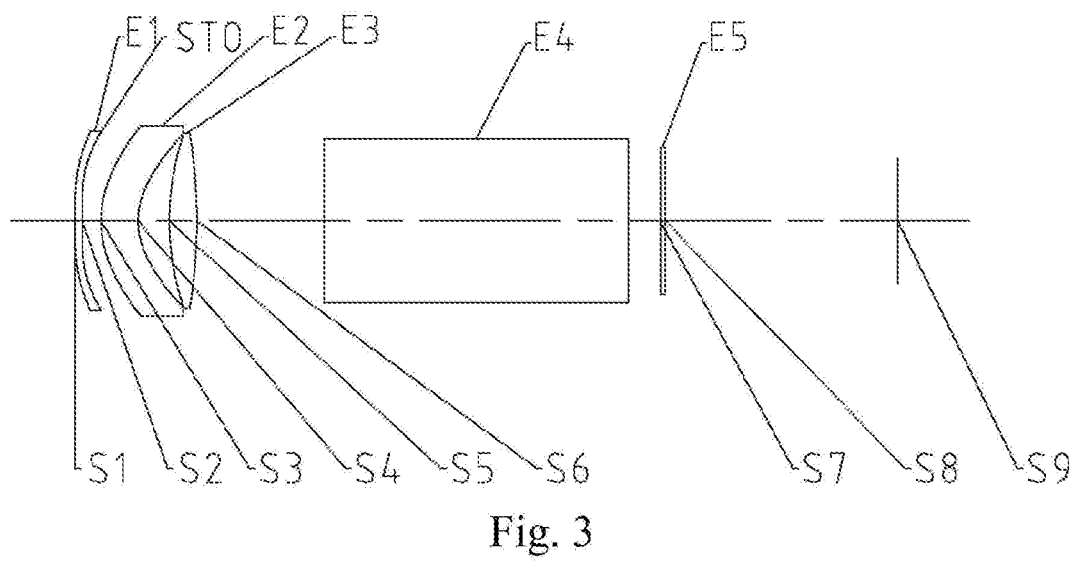
FIG. 3 illustrates a schematic structural view of an optical imaging lens assembly according to example 2 of the present disclosure.

An optical imaging lens assembly according to example 2 of the present disclosure is described below with reference to FIG. 3 to FIG. 4D. FIG. 3 shows a schematic structural view of the optical imaging lens assembly according to example 2 of the present disclosure.

As shown in FIG. 3, the optical imaging lens assembly includes a first lens E1, a stop STO, a second lens E2, a third lens E3, a prism E4, an optical filter E5 and an imaging plane S9, which are sequentially arranged from an object side to an image side along an optical axis.

The first lens E1 has negative refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The optical filter E5 has an object-side surface S7 and an image-side surface S8. Light from an object sequentially passes through the respective surfaces S1 to S8 and is finally imaged on the imaging plane S9.

In this example, a total effective focal length f of the optical imaging lens assembly is 26.90 mm, and a maximum field-of-view FOV of the optical imaging lens assembly is 11.5°.

Table 3 is a table illustrating basic parameters of the optical imaging lens assembly of example 2, wherein the units for the radius of curvature, the thickness/distance and the focal length are millimeter (mm).

TABLE 3

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| S1 | Aspheric | 101.8172 | 0.3005 | 1.546 | 56.11 | −1000.00 | −8.1729 |
| S2 | Aspheric | 85.7220 | 0.7787 | | | | −99.0000 |
| STO | Spherical | Infinite | 0.0250 | | | | |
| S3 | Aspheric | 4.3729 | 1.5809 | 1.666 | 20.40 | −27.18 | −3.4073 |

TABLE 3-continued

| Surface number | Surface type | Radius of curvature | Thickness/ Distance | Material Refractive index | Abbe number | Focal length | Conic coefficient |
|---|---|---|---|---|---|---|---|
| S4 | Aspheric | 3.0136 | 1.3423 | | | | −1.0743 |
| S5 | Spherical | 11.5728 | 1.1726 | 1.642 | 60.20 | 12.19 | |
| S6 | Spherical | −23.2066 | 5.4436 | | | | |
| P | Spherical | Infinite | 13.0000 | 1.789 | 43.93 | | |
| | Spherical | Infinite | 1.3650 | | | | |
| S7 | Spherical | Infinite | 0.2100 | 1.517 | 64.17 | | |
| S8 | Spherical | Infinite | 9.9514 | | | | |
| S9 | Spherical | Infinite | | | | | |

In example 2, the object-side surface and the image-side surface of the first lens and the second lens of the first lens E1 to the third lens E3 are aspheric. Table 4 below shows high-order coefficients A4, A6, A8, A10, A12, A14, A16, A18 and A20 applicable to each aspheric surface S1 to S4 in example 2.

TABLE 4

| Surface number | A4 | A6 | A8 | A10 | A12 |
|---|---|---|---|---|---|
| S1 | 1.3608E−03 | 1.8347E−03 | −4.7970E−04 | 6.1214E−05 | −3.9533E−06 |
| S2 | 4.2261E−04 | 2.7887E−03 | −7.2733E−04 | 9.7176E−05 | −6.8477E−06 |
| S3 | 6.9822E−04 | 8.0484E−04 | −2.5955E−04 | 4.4356E−05 | −4.6927E−06 |
| S4 | −3.3872E−03 | 6.7372E−04 | −2.0064E−04 | 4.1011E−05 | −5.3866E−06 |

| Surface number | A14 | A16 | A18 | A20 |
|---|---|---|---|---|
| S1 | 5.9751E−08 | 7.9600E−09 | −4.8566E−10 | 8.6156E−12 |
| S2 | 1.6271E−07 | 9.2346E−09 | −7.0099E−10 | 1.3418E−11 |
| S3 | 3.1583E−07 | −1.3172E−08 | 3.1023E−10 | −3.1540E−12 |
| S4 | 4.5400E−07 | −2.3740E−08 | 6.9948E−10 | −8.8617E−12 |

Figure 4A:
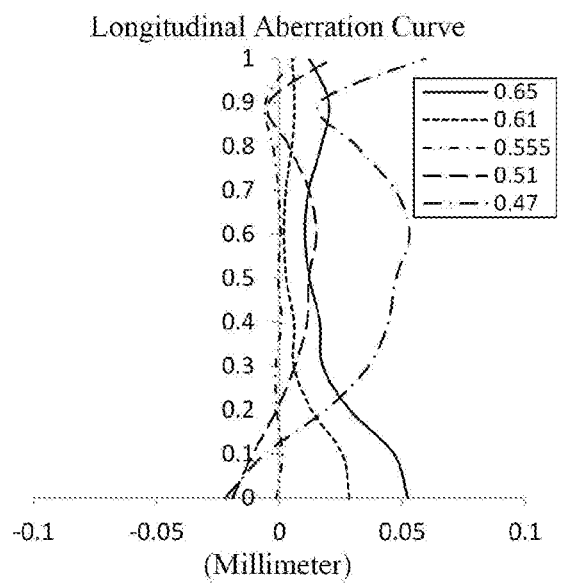
FIGS. 4A to 4D illustrate a longitudinal aberration curve, an astigmatic curve, a distortion curve, and a lateral color curve of the optical imaging lens assembly of the example 2, respectively.
Figure 4B:
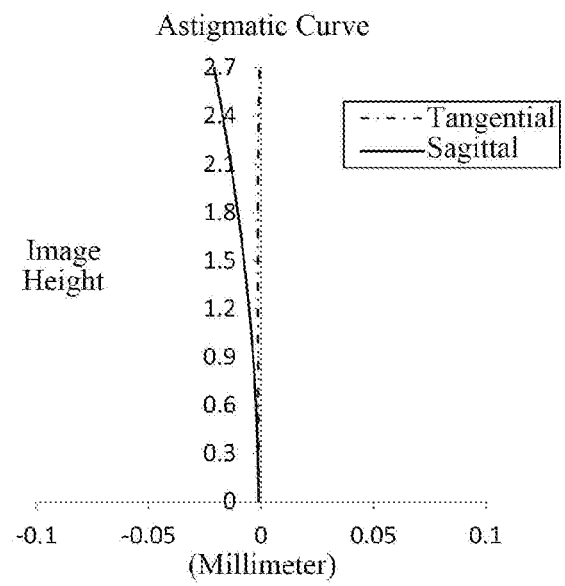
Figure 4C:
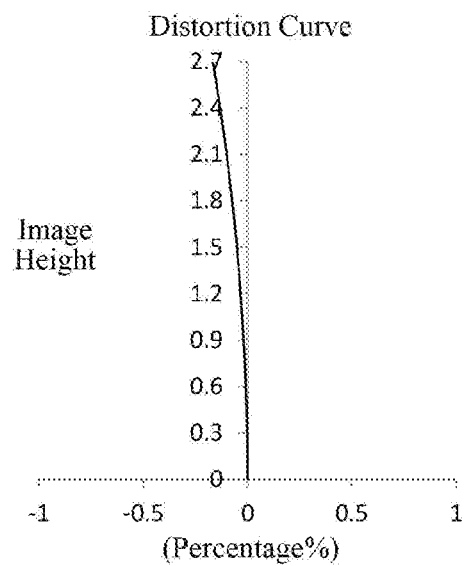
Figure 4D:
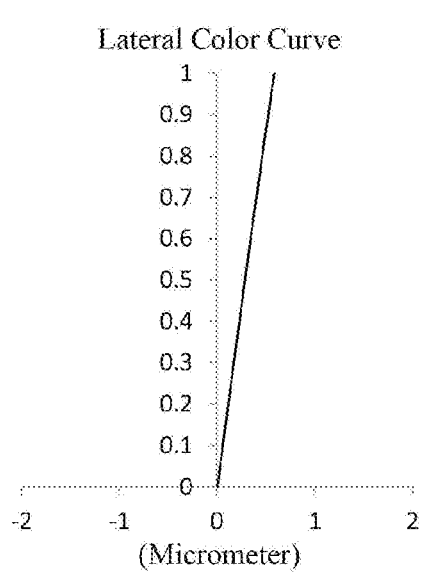

FIG. 4A illustrates a longitudinal aberration curve of the optical imaging lens assembly according to example 2, representing deviations of focal points converged by light of different wavelengths after passing through the lens assembly. FIG. 4B illustrates an astigmatic curve of the optical imaging lens assembly according to example 2, representing a curvature of a tangential plane and a curvature of a sagittal plane. FIG. 4C illustrates a distortion curve of the optical imaging lens assembly according to example 2, representing amounts of distortion corresponding to different image heights. FIG. 4D illustrates a lateral color curve of the optical imaging lens assembly according to example 2, representing deviations of different image heights on an imaging plane after light passes through the lens assembly. It can be seen from FIG. 4A to FIG. 4D that the optical imaging lens assembly provided in example 2 may achieve good image quality.

Example 3

Figure 5:
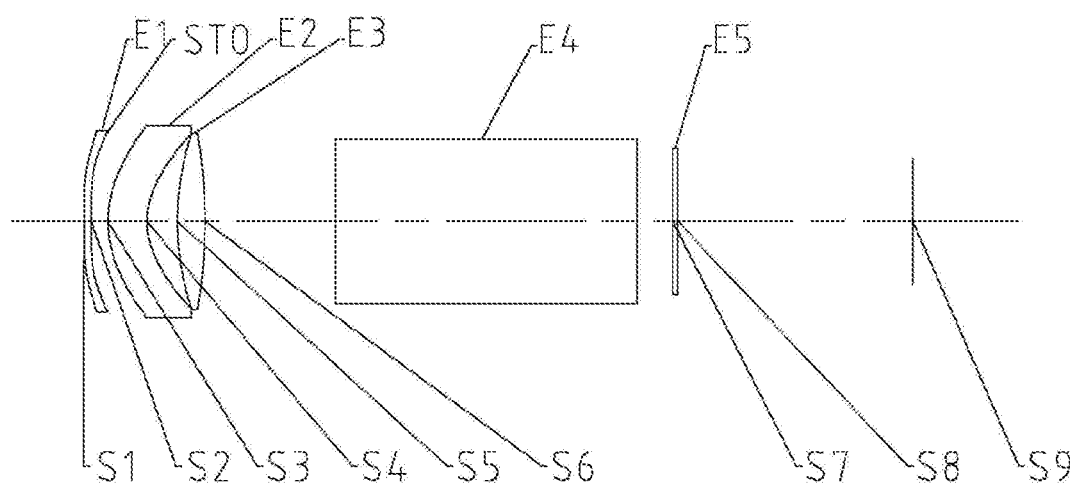
FIG. 5 illustrates a schematic structural view of an optical imaging lens assembly according to example 3 of the present disclosure.

An optical imaging lens assembly according to example 3 of the present disclosure is described below with reference to FIG. 5 to FIG. 6D. FIG. 5 shows a schematic structural view of the optical imaging lens assembly according to example 3 of the present disclosure.

As shown in FIG. 5, the optical imaging lens assembly includes a first lens E1, a stop STO, a second lens E2, a third lens E3, a prism E4, an optical filter E5 and an imaging plane S9, which are sequentially arranged from an object side to an image side along an optical axis.

The first lens E1 has negative refractive power, an object-side surface S1 thereof is a concave surface, and an image-side surface S2 thereof is a convex surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The optical filter E5 has an object-side surface S7 and an image-side surface S8. Light from an object sequentially passes through the respective surfaces S1 to S8 and is finally imaged on the imaging plane S9.

In this example, a total effective focal length f of the optical imaging lens assembly is 27.50 mm, and a maximum field-of-view FOV of the optical imaging lens assembly is 11.3°.

Table 5 is a table illustrating basic parameters of the optical imaging lens assembly of example 3, wherein the units for the radius of curvature, the thickness/distance and the focal length are millimeter (mm).

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −400.0000 | 0.3000 | 1.546 | 56.11 | −1000.00 | 99.0000 |
| S2 | Aspheric | −1497.2681 | 0.6962 | | | | 99.0000 |
| STO | Spherical | Infinite | 0.0250 | | | | |
| S3 | Aspheric | 4.6683 | 1.6791 | 1.666 | 20.40 | −28.22 | −3.5540 |
| S4 | Aspheric | 3.2023 | 1.3181 | | | | −1.0613 |
| S5 | Spherical | 12.2072 | 1.1815 | 1.642 | 60.20 | 12.54 | |
| S6 | Spherical | −22.7174 | 5.6239 | | | | |
| P | Spherical | Infinite | 13.0000 | 1.789 | 43.93 | | |
| | Spherical | Infinite | 1.5454 | | | | |
| S7 | Spherical | Infinite | 0.2100 | 1.517 | 64.17 | | |
| S8 | Spherical | Infinite | 10.1317 | | | | |
| S9 | Spherical | Infinite | | | | | |

In example 3, the object-side surface and the image-side surface of the first lens and the second lens of the first lens E1 to the third lens E3 are aspheric. Table 6 below shows high-order coefficients A4, A6, A8, A10, A12, A14, A16, A18 and A20 applicable to each aspheric surface S1 to S4 in example 3.

TABLE 6

| Surface number | A4 | A6 | A8 | A10 | A12 |
|---|---|---|---|---|---|
| S1 | 1.4997E−03 | 1.5998E−03 | −3.7653E−04 | 3.8689E−05 | −1.2170E−06 |
| S2 | 5.1692E−04 | 2.5014E−03 | −5.9174E−04 | 6.6590E−05 | −3.0652E−06 |
| S3 | 4.1820E−04 | 7.7404E−04 | −2.2635E−04 | 3.5778E−05 | −3.4967E−06 |
| S4 | −3.1286E−03 | 5.4574E−04 | −1.4096E−04 | 2.5731E−05 | −3.0101E−06 |

| Surface number | A14 | A16 | A18 | A20 |
|---|---|---|---|---|
| S1 | −1.3425E−07 | 1.5738E−08 | −6.3833E−10 | 9.5334E−12 |
| S2 | −1.0706E−07 | 1.9882E−08 | −8.9467E−10 | 1.4168E−11 |
| S3 | 2.1543E−07 | −8.1367E−09 | 1.7186E−10 | −1.5540E−12 |
| S4 | 2.2157E−07 | −9.8565E−09 | 2.3949E−10 | −2.4061E−12 |

Figure 6A:
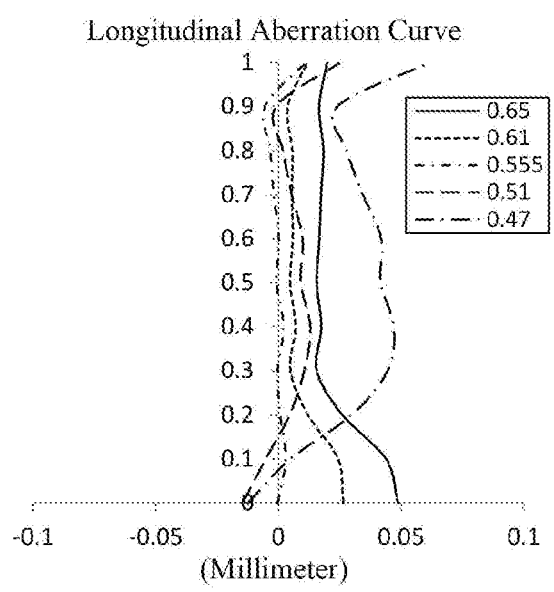
Figure 6B:
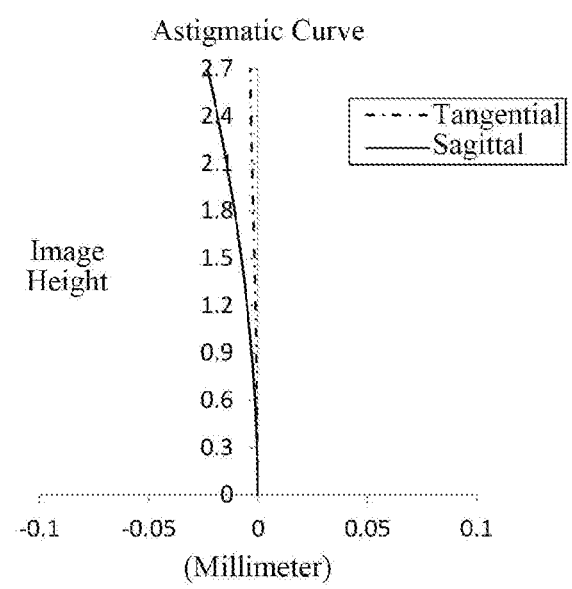

FIG. 6A illustrates a longitudinal aberration curve of the optical imaging lens assembly according to example 3, representing deviations of focal points converged by light of different wavelengths after passing through the lens assembly. FIG. 6B illustrates an astigmatic curve of the optical imaging lens assembly according to example 3, representing a curvature of a tangential plane and a curvature of a sagittal plane. FIG. 6C illustrates a distortion curve of the optical imaging lens assembly according to example 3, representing amounts of distortion corresponding to different image heights. FIG. 6D illustrates a lateral color curve of the optical imaging lens assembly according to example 3, representing deviations of different image heights on an imaging plane after light passes through the lens assembly. It can be seen from FIG. 6A to FIG. 6D that the optical imaging lens assembly provided in example 3 may achieve good image quality.

Example 4

An optical imaging lens assembly according to example 4 of the present disclosure is described below with reference to FIG. 7 to FIG. 8D. FIG. 7 shows a schematic structural view of the optical imaging lens assembly according to example 4 of the present disclosure.

As shown in FIG. 7, the optical imaging lens assembly includes a first lens E1, a stop STO, a second lens E2, a third lens E3, a prism E4, an optical filter E5 and an imaging plane S9, which are sequentially arranged from an object side to an image side along an optical axis.

The first lens E1 has positive refractive power, an object-side surface S1 thereof is a concave surface, and an image-side surface S2 thereof is a convex surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The optical filter E5 has an object-side surface S7 and an image-side surface S8. Light from an object sequentially passes through the respective surfaces S1 to S8 and is finally imaged on the imaging plane S9.

In this example, a total effective focal length f of the optical imaging lens assembly is 28.00 mm, and a maximum field-of-view FOV of the optical imaging lens assembly is 11.1°.

Table 7 is a table illustrating basic parameters of the optical imaging lens assembly of example 4, wherein the units for the radius of curvature, the thickness/distance and the focal length are millimeter (mm).

TABLE 7

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −400.0000 | 0.3036 | 1.546 | 56.11 | 149.92 | 99.0000 |
| S2 | Aspheric | −67.9552 | 0.6059 | | | | 85.5331 |
| STO | Spherical | Infinite | 0.0250 | | | | |
| S3 | Aspheric | 4.9107 | 1.6697 | 1.666 | 20.40 | −27.20 | −3.6300 |
| S4 | Aspheric | 3.3390 | 1.3206 | | | | −1.0519 |
| S5 | Spherical | 13.8217 | 1.0753 | 1.642 | 60.20 | 13.97 | |
| S6 | Spherical | −24.7424 | 5.6327 | | | | |
| P | Spherical | Infinite | 13.0000 | 1.789 | 43.93 | | |
| | Spherical | Infinite | 1.5542 | | | | |
| S7 | Spherical | Infinite | 0.2100 | 1.517 | 64.17 | | |
| S8 | Spherical | Infinite | 10.1406 | | | | |
| S9 | Spherical | Infinite | | | | | |

In example 4, the object-side surface and the image-side surface of the first lens and the second lens of the first lens E1 to the third lens E3 are aspheric. Table 8 below shows high-order coefficients A4, A6, A8, A10, A12, A14, A16, A18 and A20 applicable to each aspheric surface S1 to S4 in example 4.

TABLE 8

| Surface number | A4 | A6 | A8 | A10 | A12 |
|---|---|---|---|---|---|
| S1 | 1.6821E−03 | 1.2718E−03 | −2.6120E−04 | 1.7968E−05 | 9.4854E−07 |
| S2 | 1.2142E−03 | 2.0360E−03 | −4.5553E−04 | 4.4506E−05 | −1.0599E−06 |
| S3 | 5.8476E−04 | 6.7696E−04 | −2.0474E−04 | 3.2655E−05 | −3.2122E−06 |
| S4 | −2.8827E−03 | 4.5462E−04 | −1.1102E−04 | 1.9721E−05 | −2.2707E−06 |

| Surface number | A14 | A16 | A18 | A20 |
|---|---|---|---|---|
| S1 | −2.6798E−07 | 2.0368E−08 | −7.1358E−10 | 9.8160E−12 |
| S2 | −1.9979E−07 | 2.1020E−08 | −8.3037E−10 | 1.2253E−11 |
| S3 | 1.9907E−07 | −7.5449E−09 | 1.5929E−10 | −1.4331E−12 |
| S4 | 1.6422E−07 | −7.0722E−09 | 1.6144E−10 | −1.4389E−12 |

Figure 8A:
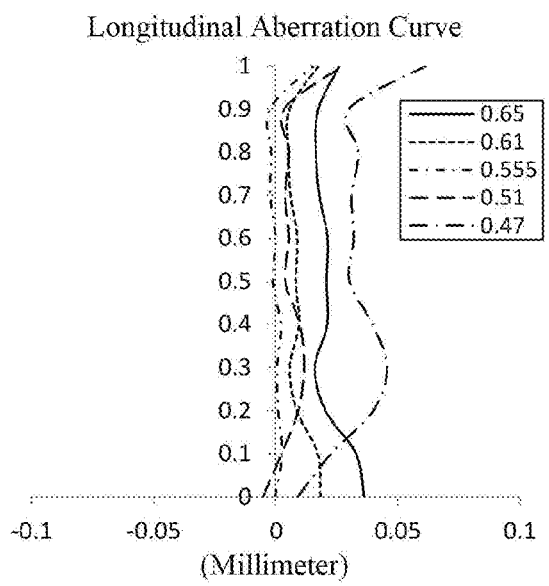
FIGS. 8A to 8D illustrate a longitudinal aberration curve, an astigmatic curve, a distortion curve, and a lateral color curve of the optical imaging lens assembly of the example 4, respectively.
Figure 8B:
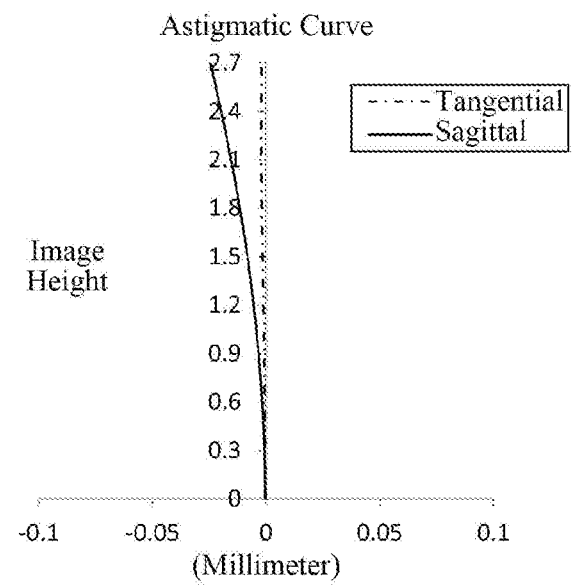
Figure 8C:
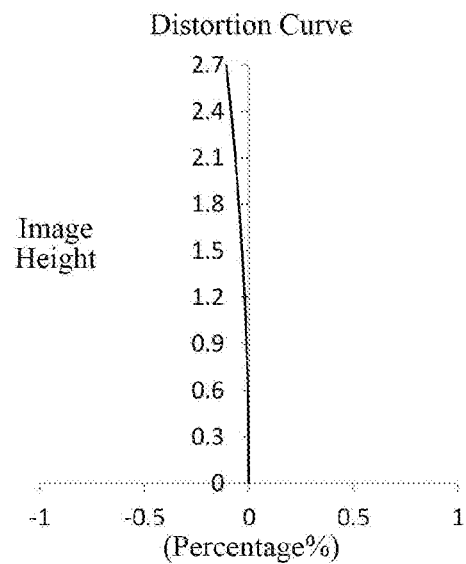
Figure 8D:
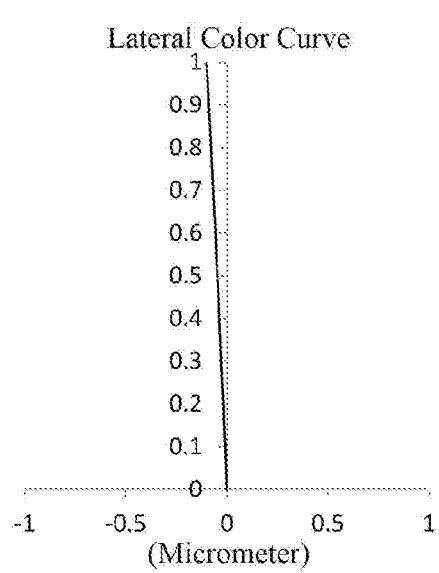

FIG. 8A illustrates a longitudinal aberration curve of the optical imaging lens assembly according to example 4, representing deviations of focal points converged by light of different wavelengths after passing through the lens assembly. FIG. 8B illustrates an astigmatic curve of the optical imaging lens assembly according to example 4, representing a curvature of a tangential plane and a curvature of a sagittal plane. FIG. 8C illustrates a distortion curve of the optical imaging lens assembly according to example 4, representing amounts of distortion corresponding to different image heights. FIG. 8D illustrates a lateral color curve of the optical imaging lens assembly according to example 4, representing deviations of different image heights on an imaging plane after light passes through the lens assembly. It can be seen from FIG. 8A to FIG. 8D that the optical imaging lens assembly provided in example 4 may achieve good image quality.

Example 5

Figure 9:
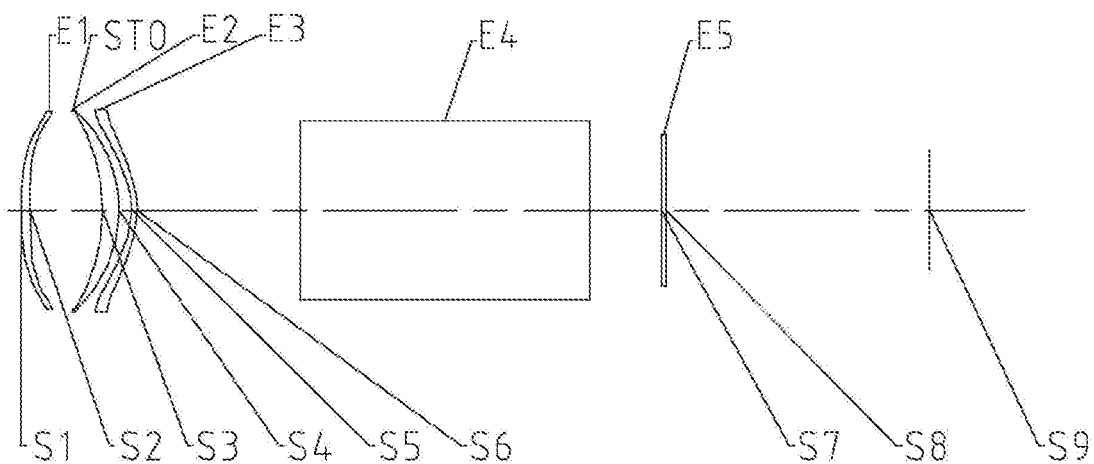
FIG. 9 illustrates a schematic structural view of an optical imaging lens assembly according to example 5 of the present disclosure.

An optical imaging lens assembly according to example 5 of the present disclosure is described below with reference to FIG. 9 to FIG. 10D. FIG. 9 shows a schematic structural view of the optical imaging lens assembly according to example 5 of the present disclosure.

As shown in FIG. 9, the optical imaging lens assembly includes a first lens E1, a stop STO, a second lens E2, a third lens E3, a prism E4, an optical filter E5 and an imaging plane S9, which are sequentially arranged from an object side to an image side along an optical axis.

The first lens E1 has positive refractive power, an object-side surface S1 thereof is a convex surface, and an image-side surface S2 thereof is a convex surface. The second lens E2 has positive refractive power, an object-side surface S3 thereof is a concave surface, and an image-side surface S4 thereof is a convex surface. The third lens E3 has negative refractive power, an object-side surface S5 thereof is a concave surface, and an image-side surface S6 thereof is a convex surface. The optical filter E5 has an object-side surface S7 and an image-side surface S8. Light from an object sequentially passes through the respective surfaces S1 to S8 and is finally imaged on the imaging plane S9.

In this example, a total effective focal length f of the optical imaging lens assembly is 31.62 mm, and a maximum field-of-view FOV of the optical imaging lens assembly is 9.8°.

Table 9 is a table illustrating basic parameters of the optical imaging lens assembly of example 5, wherein the units for the radius of curvature, the thickness/distance and the focal length are millimeter (mm).

TABLE 9

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 27.9818 | 0.3972 | 1.546 | 56.11 | 48.12 | 23.6290 |
| S2 | Aspheric | −427.0566 | 1.9002 | | | | 99.0000 |
| STO | Spherical | Infinite | 1.3451 | | | | |
| S3 | Spherical | −8.6369 | 0.7352 | 1.642 | 60.20 | 30.70 | |
| S4 | Spherical | −6.2049 | 0.5722 | | | | |
| S5 | Aspheric | −3.4502 | 0.2521 | 1.666 | 20.40 | −53.77 | −1.2445 |
| S6 | Aspheric | −3.9289 | 7.2899 | | | | −5.7851 |
| P | Spherical | Infinite | 13.0000 | 1.789 | 43.93 | | |
| | Spherical | Infinite | 3.2114 | | | | |
| S7 | Spherical | Infinite | 0.2100 | 1.517 | 64.17 | | |
| S8 | Spherical | Infinite | 11.8161 | | | | |
| S9 | Spherical | Infinite | | | | | |

In example 5, the object-side surface and the image-side surface of the first lens and the third lens of the first lens E1 to the third lens E3 are aspheric. Table 10 below shows high-order coefficients A4, A6, A8, A10, A12, A14, A16, A18 and A20 applicable to each aspheric surface S1, S2, S5 and S6 in example 5.

TABLE 10

| Surface number | A4 | A6 | A8 | A10 | A12 |
|---|---|---|---|---|---|
| S1 | 2.7957E−03 | 4.6069E−05 | −4.4034E−05 | 1.0871E−05 | −1.5160E−06 |
| S2 | 3.4994E−03 | 2.6869E−05 | −3.9663E−05 | 1.0315E−05 | −1.4922E−06 |
| S5 | 7.6556E−03 | −7.1371E−04 | 2.6379E−05 | 2.6478E−06 | −4.2666E−07 |
| S6 | −2.1532E−03 | 8.2491E−04 | −1.9767E−04 | 2.9486E−05 | −2.8184E−06 |

| Surface number | A14 | A16 | A18 | A20 |
|---|---|---|---|---|
| S1 | 1.2598E−07 | −6.0986E−09 | 1.5669E−10 | −1.6472E−12 |
| S2 | 1.2891E−07 | −6.4868E−09 | 1.7343E−10 | −1.9000E−12 |
| S5 | 2.4281E−08 | −6.1769E−10 | 6.0156E−12 | −8.5159E−15 |
| S6 | 1.7237E−07 | −6.5437E−09 | 1.4175E−10 | −1.3442E−12 |

Figure 10A:
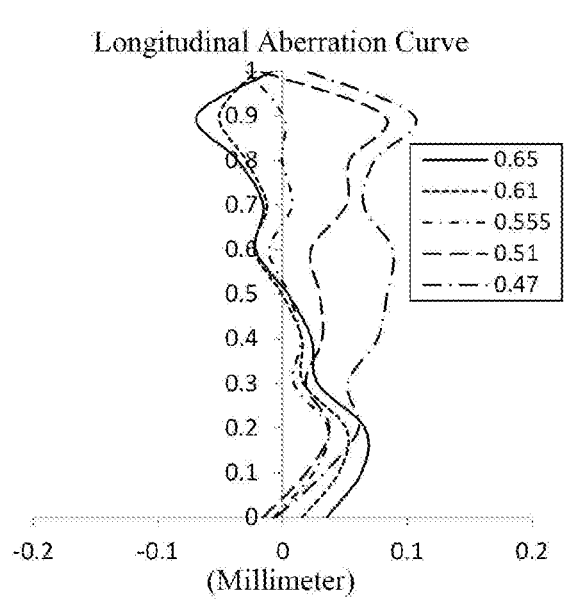
Figure 10B:
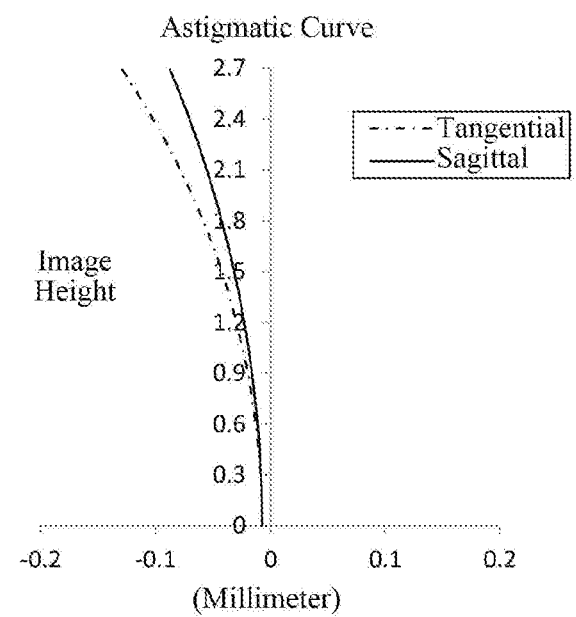

FIG. 10A illustrates a longitudinal aberration curve of the optical imaging lens assembly according to example 5, representing deviations of focal points converged by light of different wavelengths after passing through the lens assembly. FIG. 10B illustrates an astigmatic curve of the optical imaging lens assembly according to example 5, representing a curvature of a tangential plane and a curvature of a sagittal plane. FIG. 10C illustrates a distortion curve of the optical imaging lens assembly according to example 5, representing amounts of distortion corresponding to different image heights. FIG. 10D illustrates a lateral color curve of the optical imaging lens assembly according to example 5, representing deviations of different image heights on an imaging plane after light passes through the lens assembly. It can be seen from FIG. 10A to FIG. 10D that the optical imaging lens assembly provided in example 5 may achieve good image quality.

Example 6

An optical imaging lens assembly according to example 6 of the present disclosure is described below with reference to FIG. 11 to FIG. 12D. FIG. 11 shows a schematic structural view of the optical imaging lens assembly according to example 6 of the present disclosure.

As shown in FIG. 11, the optical imaging lens assembly includes a first lens E1, a stop STO, a second lens E2, a third lens E3, a prism E4, an optical filter E5 and an imaging plane S9, which are sequentially arranged from an object side to an image side along an optical axis.

The first lens E1 has positive refractive power, an object-side surface S1 thereof is a convex surface, and an image-side surface S2 thereof is a convex surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The optical filter E5 has an object-side surface S7 and an image-side surface S8. Light from an object sequentially passes through the respective surfaces S1 to S8 and is finally imaged on the imaging plane S9.

In this example, a total effective focal length f of the optical imaging lens assembly is 29.41 mm, and a maximum field-of-view FOV of the optical imaging lens assembly is 10.5°.

Table 11 is a table illustrating basic parameters of the optical imaging lens assembly of example 6, wherein the units for the radius of curvature, the thickness/distance and the focal length are millimeter (mm).

TABLE 11

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 673.4361 | 0.3162 | 1.546 | 56.11 | 61.48 | −99.0000 |
| S2 | Aspheric | −35.3159 | 0.5664 | | | | 58.5816 |
| STO | Spherical | Infinite | 0.0250 | | | | |
| S3 | Aspheric | 4.4688 | 1.6015 | 1.666 | 20.40 | −22.10 | −2.7574 |
| S4 | Aspheric | 2.9374 | 1.4988 | | | | −0.9881 |
| S5 | Spherical | 9.3803 | 1.0921 | 1.642 | 60.20 | 14.74 | |
| S6 | Spherical | 1000.0000 | 5.6920 | | | | |
| P | Spherical | Infinite | 13.0000 | 1.789 | 43.93 | | |
| | Spherical | Infinite | 1.6135 | | | | |
| S7 | Spherical | Infinite | 0.2100 | 1.517 | 64.17 | | |
| S8 | Spherical | Infinite | 10.1999 | | | | |
| S9 | Spherical | Infinite | | | | | |

In example 6, the object-side surface and the image-side surface of the first lens and the second lens of the first lens E1 to the third lens E3 are aspheric. Table 12 below shows high-order coefficients A4, A6, A8, A10, A12, A14, A16, A18 and A20 applicable to each aspheric surface S1 to S4 in example 6.

TABLE 12

| Surface number | A4 | A6 | A8 | A10 | A12 |
|---|---|---|---|---|---|
| S1 | 1.7881E−04 | 1.1728E−03 | −2.0013E−04 | 8.2713E−06 | 1.6728E−06 |
| S2 | 9.1936E−04 | 1.6321E−03 | −3.5430E−04 | 3.3250E−05 | −6.6698E−07 |
| S3 | 1.9690E−03 | 4.3563E−04 | −1.7686E−04 | 3.1568E−05 | −3.3279E−06 |
| S4 | −1.5624E−03 | 3.3826E−04 | −1.2803E−04 | 3.0433E−05 | −4.3993E−06 |

| Surface number | A14 | A16 | A18 | A20 |
|---|---|---|---|---|
| S1 | −2.7633E−07 | 1.8031E−08 | −5.6730E−10 | 7.0795E−12 |
| S2 | −1.4724E−07 | 1.4092E−08 | −5.1236E−10 | 6.9254E−12 |
| S3 | 2.1598E−07 | −8.4587E−09 | 1.8350E−10 | −1.6967E−12 |
| S4 | 3.8571E−07 | −1.9995E−08 | 5.6328E−10 | −6.6506E−12 |

Figure 12A:
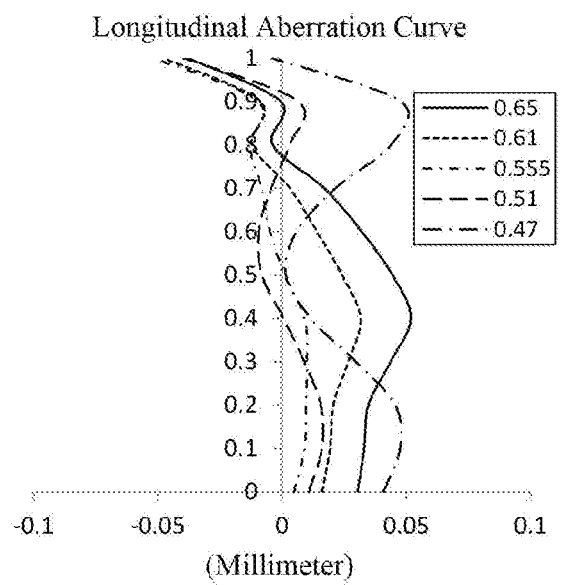
FIGS. 12A to 12D illustrate a longitudinal aberration curve, an astigmatic curve, a distortion curve, and a lateral color curve of the optical imaging lens assembly of the example 6, respectively.
Figure 12B:
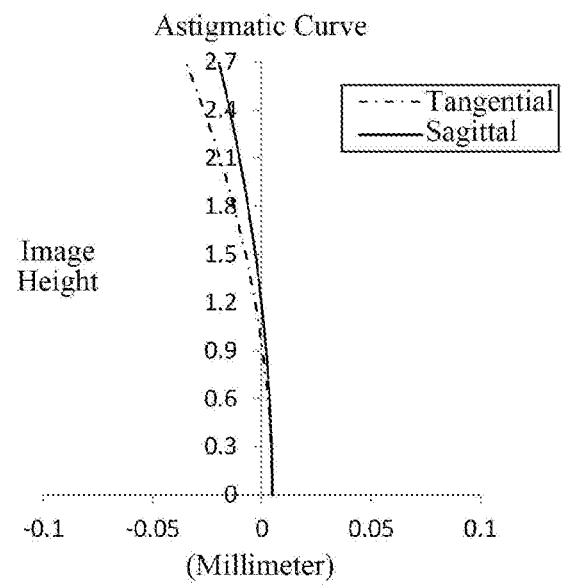
Figure 12C:
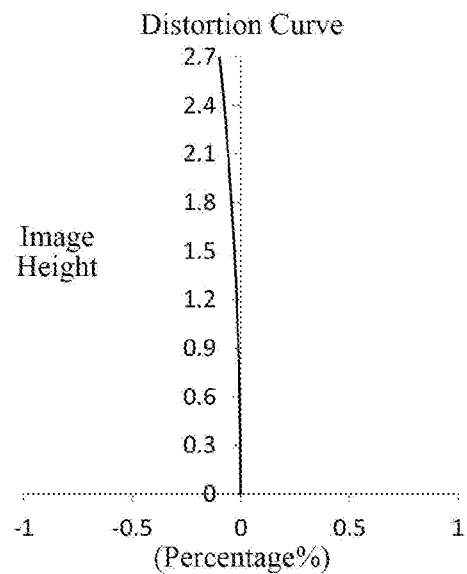
Figure 12D:
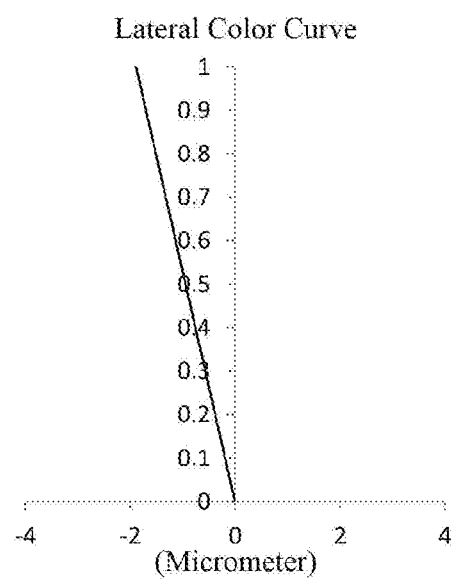

FIG. 12A illustrates a longitudinal aberration curve of the optical imaging lens assembly according to example 6, representing deviations of focal points converged by light of different wavelengths after passing through the lens assembly. FIG. 12B illustrates an astigmatic curve of the optical imaging lens assembly according to example 6, representing a curvature of a tangential plane and a curvature of a sagittal plane. FIG. 12C illustrates a distortion curve of the optical imaging lens assembly according to example 6, representing amounts of distortion corresponding to different image heights. FIG. 12D illustrates a lateral color curve of the optical imaging lens assembly according to example 6, representing deviations of different image heights on an imaging plane after light passes through the lens assembly. It can be seen from FIG. 12A to FIG. 12D that the optical imaging lens assembly provided in example 6 may achieve good image quality.

Example 7

An optical imaging lens assembly according to example 7 of the present disclosure is described below with reference to FIG. 13 to FIG. 14D. FIG. 13 shows a schematic structural view of the optical imaging lens assembly according to example 7 of the present disclosure.

As shown in FIG. 13, the optical imaging lens assembly includes a first lens E1, a stop STO, a second lens E2, a third lens E3, a prism E4, an optical filter E5 and an imaging plane S9, which are sequentially arranged from an object side to an image side along an optical axis.

The first lens E1 has negative refractive power, an object-side surface S1 thereof is a concave surface, and an image-side surface S2 thereof is a convex surface. The second lens E2 has positive refractive power, an object-side surface S3 thereof is a concave surface, and an image-side surface S4 thereof is a convex surface. The third lens E3 has negative refractive power, an object-side surface S5 thereof is a concave surface, and an image-side surface S6 thereof is a convex surface. The optical filter E5 has an object-side surface S7 and an image-side surface S8. Light from an object sequentially passes through the respective surfaces S1 to S8 and is finally imaged on the imaging plane S9.

In this example, a total effective focal length f of the optical imaging lens assembly is 27.50 mm, and a maximum field-of-view FOV of the optical imaging lens assembly is 11.3°.

Table 13 is a table illustrating basic parameters of the optical imaging lens assembly of example 7, wherein the units for the radius of curvature, the thickness/distance and the focal length are millimeter (mm).

TABLE 13

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −38.6435 | 0.3000 | 1.546 | 56.11 | −650.00 | 79.9829 |
| S2 | Aspheric | −43.4856 | 1.7757 | | | | 87.6556 |
| STO | Spherical | Infinite | 0.7804 | | | | |
| S3 | Spherical | −12.5242 | 1.3734 | 1.642 | 60.20 | 16.47 | |
| S4 | Spherical | −5.9793 | 0.7705 | | | | |
| S5 | Aspheric | −3.2305 | 0.3000 | 1.666 | 20.40 | −46.90 | −1.1705 |
| S6 | Aspheric | −3.7364 | 6.8432 | | | | −4.3213 |
| P | Spherical | Infinite | 13.0000 | 1.789 | 43.93 | | |
| | Spherical | Infinite | 2.7647 | | | | |
| S7 | Spherical | Infinite | 0.2100 | 1.517 | 64.17 | | |
| S8 | Spherical | Infinite | 11.3562 | | | | |
| S9 | Spherical | Infinite | | | | | |

In example 7, the object-side surface and the image-side surface of the first lens and the third lens of the first lens E1 to the third lens E3 are aspheric. Table 14 below shows high-order coefficients A4, A6, A8, A10, A12, A14, A16, A18 and A20 applicable to each aspheric surface S1, S2, S5 and S6 in example 7.

TABLE 14

| Surface number | A4 | A6 | A8 | A10 | A12 |
|---|---|---|---|---|---|
| S1 | 2.2320E−03 | 5.8510E−04 | −1.8398E−04 | 3.0833E−05 | −3.5575E−06 |
| S2 | 2.9556E−03 | 6.4668E−04 | −1.9549E−04 | 3.3455E−05 | −3.9939E−06 |
| S5 | 4.7735E−03 | 1.3814E−04 | −1.1915E−04 | 1.9149E−05 | −1.7254E−06 |
| S6 | −3.0512E−03 | 1.0173E−03 | −2.0903E−04 | 2.6911E−05 | −2.2766E−06 |

| Surface number | A14 | A16 | A18 | A20 |
|---|---|---|---|---|
| S1 | 2.6401E−07 | −1.1763E−08 | 2.8675E−10 | −2.9497E−12 |
| S2 | 3.0985E−07 | −1.4626E−08 | 3.8627E−10 | −4.4442E−12 |
| S5 | 9.2408E−08 | −2.7768E−09 | 4.1044E−11 | −2.0168E−13 |
| S6 | 1.2405E−07 | −4.1265E−09 | 7.5882E−11 | −5.8520E−13 |

Figure 14C:
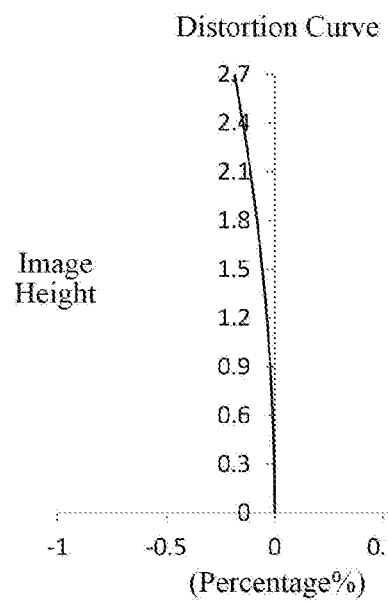
Figure 14D:
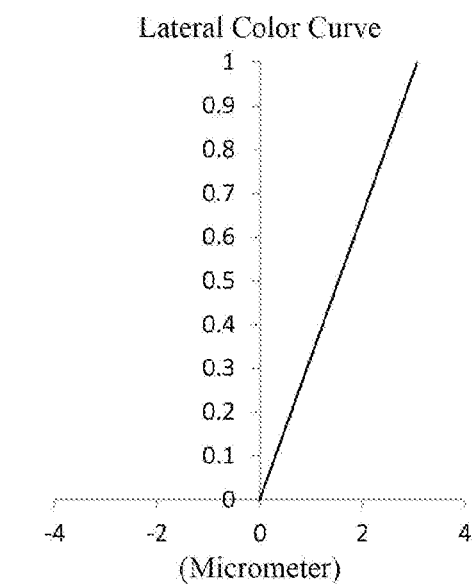

FIG. 14A illustrates a longitudinal aberration curve of the optical imaging lens assembly according to example 7, representing deviations of focal points converged by light of different wavelengths after passing through the lens assembly. FIG. 14B illustrates an astigmatic curve of the optical imaging lens assembly according to example 7, representing a curvature of a tangential plane and a curvature of a sagittal plane. FIG. 14C illustrates a distortion curve of the optical imaging lens assembly according to example 7, representing amounts of distortion corresponding to different image heights. FIG. 14D illustrates a lateral color curve of the optical imaging lens assembly according to example 7, representing deviations of different image heights on an imaging plane after light passes through the lens assembly. It can be seen from FIG. 14A to FIG. 14D that the optical imaging lens assembly provided in example 7 may achieve good image quality.

Example 8

Figure 15:
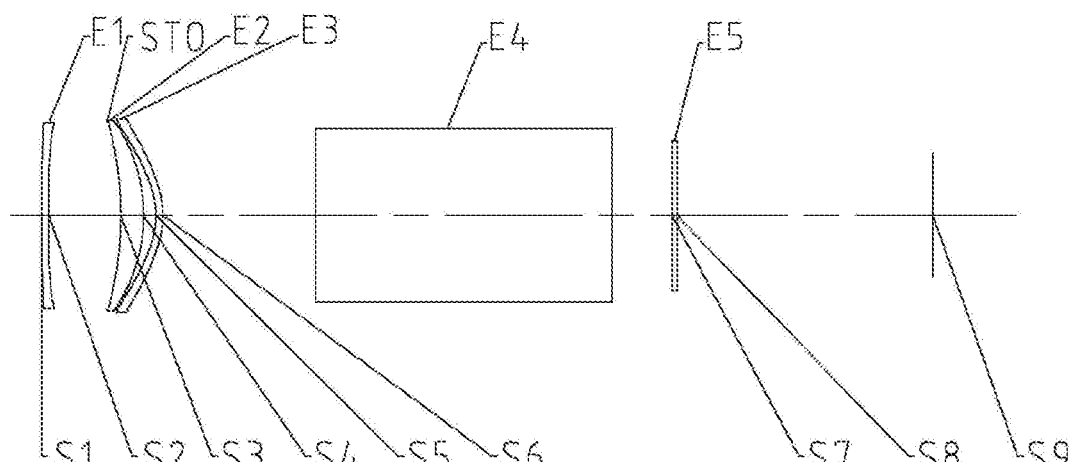
FIG. 15 illustrates a schematic structural view of an optical imaging lens assembly according to example 8 of the present disclosure.

An optical imaging lens assembly according to example 8 of the present disclosure is described below with reference to FIG. 15 to FIG. 16D. FIG. 15 shows a schematic structural view of the optical imaging lens assembly according to example 8 of the present disclosure.

As shown in FIG. 15, the optical imaging lens assembly includes a first lens E1, a stop STO, a second lens E2, a third lens E3, a prism E4, an optical filter E5 and an imaging plane S9, which are sequentially arranged from an object side to an image side along an optical axis.

The first lens E1 has positive refractive power, an object-side surface S1 thereof is a concave surface, and an image-side surface S2 thereof is a convex surface. The second lens E2 has positive refractive power, an object-side surface S3 thereof is a concave surface, and an image-side surface S4 thereof is a convex surface. The third lens E3 has negative refractive power, an object-side surface S5 thereof is a concave surface, and an image-side surface S6 thereof is a convex surface. The optical filter E5 has an object-side surface S7 and an image-side surface S8. Light from an object sequentially passes through the respective surfaces S1 to S8 and is finally imaged on the imaging plane S9.

In this example, a total effective focal length f of the optical imaging lens assembly is 27.50 mm, and a maximum field-of-view FOV of the optical imaging lens assembly is 11.3°.

Table 15 is a table illustrating basic parameters of the optical imaging lens assembly of example 8, wherein the units for the radius of curvature, the thickness/distance and the focal length are millimeter (mm).

TABLE 15

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −42.3287 | 0.3000 | 1.546 | 56.11 | 426.74 | 91.9551 |
| S2 | Aspheric | −35.9095 | 2.5626 | | | | 70.0220 |
| STO | Spherical | Infinite | 0.5878 | | | | |
| S3 | Spherical | −15.6105 | 1.0056 | 1.642 | 60.20 | 20.68 | |
| S4 | Spherical | −7.3544 | 0.5440 | | | | |
| S5 | Aspheric | −3.4382 | 0.3000 | 1.666 | 20.40 | −80.00 | −1.1705 |
| S6 | Aspheric | −3.8032 | 6.7086 | | | | −4.2959 |
| P | Spherical | Infinite | 13.0000 | 1.789 | 43.93 | | |
| | Spherical | Infinite | 2.6301 | | | | |
| S7 | Spherical | Infinite | 0.2100 | 1.517 | 64.17 | | |
| S8 | Spherical | Infinite | 11.2216 | | | | |
| S9 | Spherical | Infinite | | | | | |

In example 8, the object-side surface and the image-side surface of the first lens and the third lens of the first lens E1 to the third lens E3 are aspheric. Table 16 below shows high-order coefficients A4, A6, A8, A10, A12, A14, A16, A18 and A20 applicable to each aspheric surface S1, S2, S5 and S6 in example 8.

TABLE 16

| Surface number | A4 | A6 | A8 | A10 | A12 |
|---|---|---|---|---|---|
| S1 | 2.8027E−03 | 5.3619E−05 | −1.8042E−06 | −9.0637E−06 | 1.8296E−06 |
| S2 | 3.4584E−03 | 7.3345E−05 | −4.4813E−06 | −8.2862E−06 | 1.6042E−06 |
| S5 | 5.0401E−03 | −1.5748E−04 | −1.8659E−05 | 2.4671E−06 | −1.6902E−07 |
| S6 | −2.6146E−03 | 7.0185E−04 | −1.1784E−04 | 1.3131E−05 | −1.0970E−06 |

| Surface number | A14 | A16 | A18 | A20 |
|---|---|---|---|---|
| S1 | −1.8261E−07 | 1.0492E−08 | −3.2298E−10 | 4.0706E−12 |
| S2 | −1.4955E−07 | 7.9861E−09 | −2.2634E−10 | 2.5801E−12 |
| S5 | 7.7756E−09 | −1.7750E−10 | 1.3630E−12 | −6.6769E−15 |
| S6 | 6.6728E−08 | −2.6875E−09 | 6.3927E−11 | −6.8325E−13 |

Figure 16A:
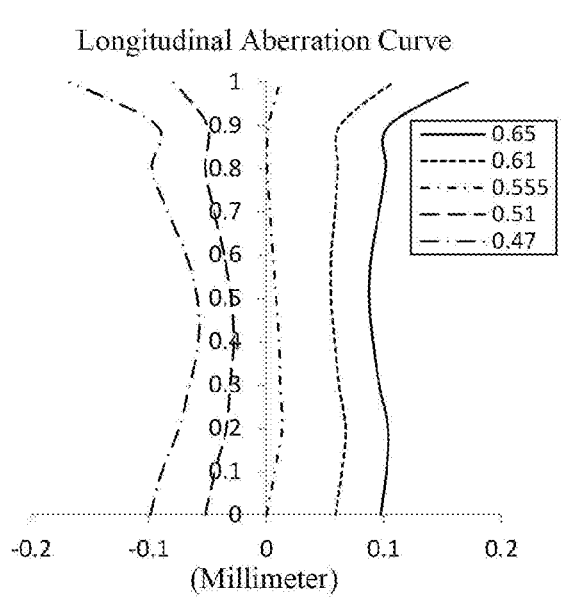
FIGS. 16A to 16D illustrate a longitudinal aberration curve, an astigmatic curve, a distortion curve, and a lateral color curve of the optical imaging lens assembly of the example 8, respectively.
Figure 16B:
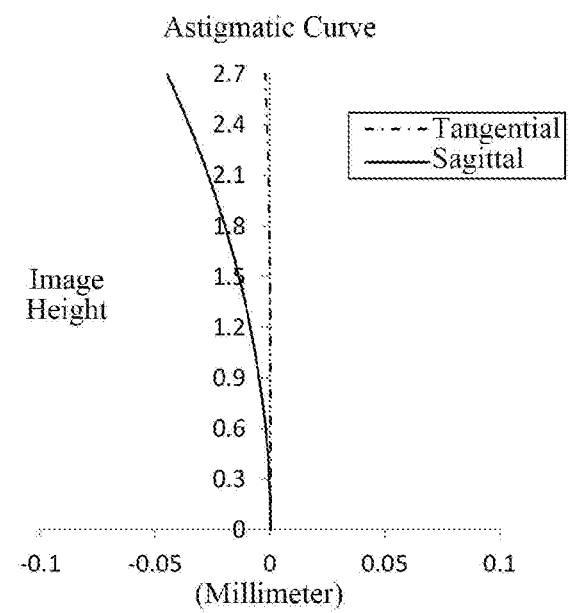
Figure 16C:
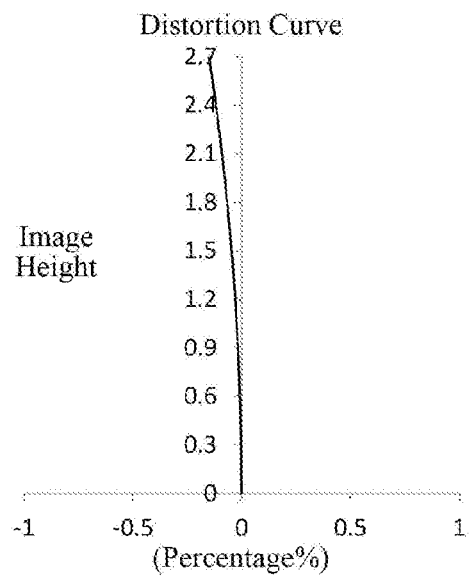
Figure 16D:
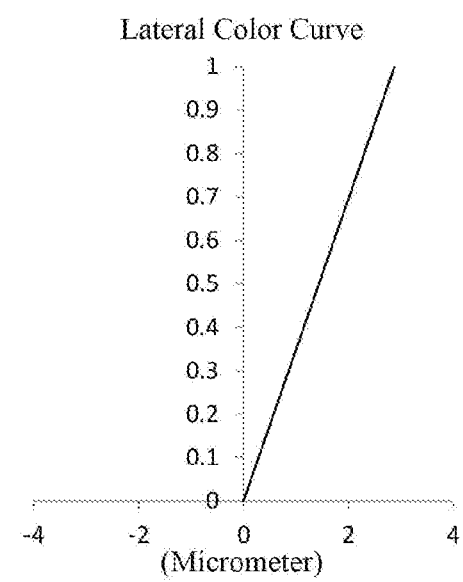

FIG. 16A illustrates a longitudinal aberration curve of the optical imaging lens assembly according to example 8, representing deviations of focal points converged by light of different wavelengths after passing through the lens assembly. FIG. 16B illustrates an astigmatic curve of the optical imaging lens assembly according to example 8, representing a curvature of a tangential plane and a curvature of a sagittal plane. FIG. 16C illustrates a distortion curve of the optical imaging lens assembly according to example 8, representing amounts of distortion corresponding to different image heights. FIG. 16D illustrates a lateral color curve of the optical imaging lens assembly according to example 8, representing deviations of different image heights on an imaging plane after light passes through the lens assembly. It can be seen from FIG. 16A to FIG. 16D that the optical imaging lens assembly provided in example 8 may achieve good image quality.

Example 9

An optical imaging lens assembly according to example 9 of the present disclosure is described below with reference to FIG. 17 to FIG. 18D. FIG. 17 shows a schematic structural view of the optical imaging lens assembly according to example 9 of the present disclosure.

As shown in FIG. 17, the optical imaging lens assembly includes a first lens E1, a stop STO, a second lens E2, a third lens E3, a prism E4, an optical filter E5 and an imaging plane S9, which are sequentially arranged from an object side to an image side along an optical axis.

The first lens E1 has positive refractive power, an object-side surface S1 thereof is a concave surface, and an image-side surface S2 thereof is a convex surface. The second lens E2 has positive refractive power, an object-side surface S3 thereof is a convex surface, and an image-side surface S4 thereof is a convex surface. The third lens E3 has negative refractive power, an object-side surface S5 thereof is a concave surface, and an image-side surface S6 thereof is a convex surface. The optical filter E5 has an object-side surface S7 and an image-side surface S8. Light from an object sequentially passes through the respective surfaces S1 to S8 and is finally imaged on the imaging plane S9.

In this example, a total effective focal length f of the optical imaging lens assembly is 34.21 mm, and a maximum field-of-view FOV of the optical imaging lens assembly is 9.0°.

Table 17 is a table illustrating basic parameters of the optical imaging lens assembly of example 9, wherein the units for the radius of curvature, the thickness/distance and the focal length are millimeter (mm).

TABLE 17

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| S1 | Aspheric | −46.3508 | 0.3214 | 1.546 | 56.11 | 442.62 | 95.3334 |
| S2 | Aspheric | −38.9853 | 0.2639 | | | | 65.8266 |
| STO | Spherical | Infinite | 0.0250 | | | | |
| S3 | Spherical | 95.8168 | 1.1864 | 1.642 | 60.20 | 19.49 | |
| S4 | Spherical | −14.3185 | 3.2033 | | | | |
| S5 | Aspheric | −3.7629 | 1.1065 | 1.666 | 20.40 | −42.31 | −1.4194 |
| S6 | Aspheric | −4.8527 | 7.4775 | | | | −7.5736 |
| P | Spherical | Infinite | 13.0000 | 1.789 | 43.93 | | |
| | Spherical | Infinite | 3.3990 | | | | |
| S7 | Spherical | Infinite | 0.2100 | 1.517 | 64.17 | | |
| S8 | Spherical | Infinite | 11.9905 | | | | |
| S9 | Spherical | Infinite | | | | | |

In example 9, the object-side surface and the image-side surface of the first lens and the third lens of the first lens E1 to the third lens E3 are aspheric. Table 18 below shows high-order coefficients A4, A6, A8, A10, A12, A14, A16, A18 and A20 applicable to each aspheric surface S1, S2, S5 and S6 in example 9.

TABLE 18

| Surface number | A4 | A6 | A8 | A10 | A12 |
|---|---|---|---|---|---|
| S1 | 2.3192E−03 | 5.1817E−04 | −1.2642E−04 | 9.9896E−06 | −3.5760E−07 |
| S2 | 2.8955E−03 | 5.5083E−04 | −1.2274E−04 | 7.2420E−06 | 7.2110E−08 |
| S5 | 4.8022E−03 | 3.2876E−04 | −1.4949E−04 | 2.2120E−05 | −1.8990E−06 |
| S6 | −3.5681E−03 | 1.1586E−03 | −1.9655E−04 | 2.1735E−05 | −1.5978E−06 |

| Surface number | A14 | A16 | A18 | A20 |
|---|---|---|---|---|
| S1 | 1.8212E−09 | 3.5403E−10 | −1.3557E−11 | 1.7492E−13 |
| S2 | −3.1409E−08 | 1.7738E−09 | −4.5708E−11 | 4.7701E−13 |
| S5 | 1.0311E−07 | −3.5144E−09 | 6.9404E−11 | −6.1258E−13 |
| S6 | 7.8847E−08 | −2.5562E−09 | 5.0255E−11 | −4.6077E−13 |

FIG. 18A illustrates a longitudinal aberration curve of the optical imaging lens assembly according to example 9, representing deviations of focal points converged by light of different wavelengths after passing through the lens assembly. FIG. 18B illustrates an astigmatic curve of the optical imaging lens assembly according to example 9, representing a curvature of a tangential plane and a curvature of a sagittal plane. FIG. 18C illustrates a distortion curve of the optical imaging lens assembly according to example 9, representing amounts of distortion corresponding to different image heights. FIG. 18D illustrates a lateral color curve of the optical imaging lens assembly according to example 9, representing deviations of different image heights on an imaging plane after light passes through the lens assembly. It can be seen from FIG. 18A to FIG. 18D that the optical imaging lens assembly provided in example 9 may achieve good image quality.

Example 10

An optical imaging lens assembly according to example 10 of the present disclosure is described below with reference to FIG. 19 to FIG. 20D. FIG. 19 shows a schematic structural view of the optical imaging lens assembly according to example 10 of the present disclosure.

As shown in FIG. 19, the optical imaging lens assembly includes a first lens E1, a stop STO, a second lens E2, a third lens E3, a prism E4, an optical filter E5 and an imaging plane S9, which are sequentially arranged from an object side to an image side along an optical axis.

The first lens E1 has positive refractive power, an object-side surface S1 thereof is a convex surface, and an image-side surface S2 thereof is a concave surface. The second lens E2 has positive refractive power, an object-side surface S3 thereof is a concave surface, and an image-side surface S4 thereof is a convex surface. The third lens E3 has negative refractive power, an object-side surface S5 thereof is a concave surface, and an image-side surface S6 thereof is a convex surface. The optical filter E5 has an object-side surface S7 and an image-side surface S8. Light from an object sequentially passes through the respective surfaces S1 to S8 and is finally imaged on the imaging plane S9.

In this example, a total effective focal length f of the optical imaging lens assembly is 27.84 mm, and a maximum field-of-view FOV of the optical imaging lens assembly is 11.1°.

Table 19 is a table illustrating basic parameters of the optical imaging lens assembly of example 10, wherein the units for the radius of curvature, the thickness/distance and the focal length are millimeter (mm).

TABLE 19

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 37.3645 | 0.3000 | 1.546 | 56.11 | 417.00 | 68.9592 |
| S2 | Aspheric | 44.5756 | 1.6242 | | | | 93.2008 |
| STO | Spherical | Infinite | 0.7592 | | | | |
| S3 | Spherical | −13.8106 | 1.2867 | 1.642 | 60.20 | 18.25 | |
| S4 | Spherical | −6.5701 | 1.0299 | | | | |
| S5 | Aspheric | −3.3423 | 0.3000 | 1.666 | 20.40 | −51.34 | −1.1642 |
| S6 | Aspheric | −3.8367 | 6.5948 | | | | −4.3958 |
| P | Spherical | Infinite | 13.0000 | 1.789 | 43.93 | | |
| | Spherical | Infinite | 2.5162 | | | | |
| S7 | Spherical | Infinite | 0.2100 | 1.517 | 64.17 | | |
| S8 | Spherical | Infinite | 11.1078 | | | | |
| S9 | Spherical | Infinite | | | | | |

In example 10, the object-side surface and the image-side surface of the first lens and the third lens of the first lens E1 to the third lens E3 are aspheric. Table 20 below shows high-order coefficients A4, A6, A8, A10, A12, A14, A16, A18 and A20 applicable to each aspheric surface S1, S2, S5 and S6 in example 10.

TABLE 20

| Surface number | A4 | A6 | A8 | A10 | A12 |
|---|---|---|---|---|---|
| S1 | −2.3836E−03 | 1.6159E−04 | −1.3303E−04 | 4.0147E−05 | −5.9403E−06 |
| S2 | −1.8978E−03 | 1.8589E−04 | −1.3559E−04 | 4.0602E−05 | −5.9627E−06 |
| S5 | 3.9244E−03 | 3.0870E−04 | −1.8973E−04 | 3.9973E−05 | −4.8594E−06 |
| S6 | −3.3631E−03 | 1.1090E−03 | −2.6122E−04 | 4.2868E−05 | −4.6287E−06 |

| Surface number | A14 | A16 | A18 | A20 |
|---|---|---|---|---|
| S1 | 4.8913E−07 | −2.2870E−08 | 5.6775E−10 | −5.8175E−12 |
| S2 | 4.8721E−07 | −2.2584E−08 | 5.5524E−10 | −5.6237E−12 |
| S5 | 3.5312E−07 | −1.4949E−08 | 3.3730E−10 | −3.1038E−12 |
| S6 | 3.1388E−07 | −1.2719E−08 | 2.7956E−10 | −2.5478E−12 |

Figure 20A:
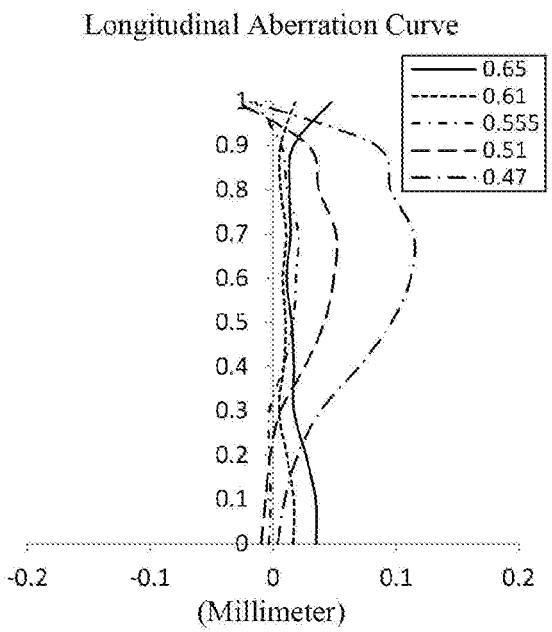
FIGS. 20A to 20D illustrate a longitudinal aberration curve, an astigmatic curve, a distortion curve, and a lateral color curve of the optical imaging lens assembly of the example 10, respectively.
Figure 20B:
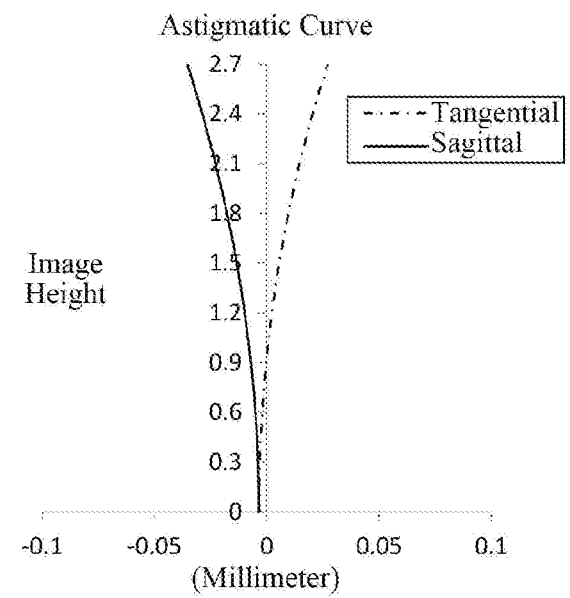
Figure 20C:
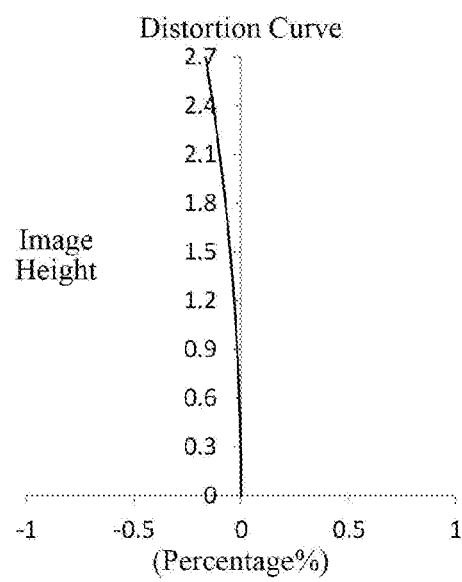
Figure 20D:
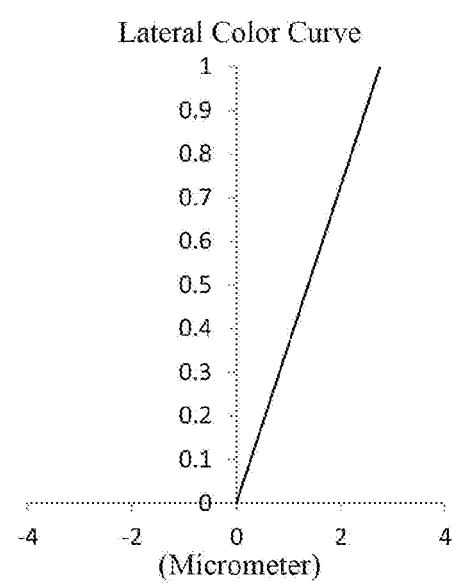

FIG. 20A illustrates a longitudinal aberration curve of the optical imaging lens assembly according to example 10, representing deviations of focal points converged by light of different wavelengths after passing through the lens assembly. FIG. 20B illustrates an astigmatic curve of the optical imaging lens assembly according to example 10, representing a curvature of a tangential plane and a curvature of a sagittal plane. FIG. 20C illustrates a distortion curve of the optical imaging lens assembly according to example 10, representing amounts of distortion corresponding to different image heights. FIG. 20D illustrates a lateral color curve of the optical imaging lens assembly according to example 10, representing deviations of different image heights on an imaging plane after light passes through the lens assembly. It can be seen from FIG. 20A to FIG. 20D that the optical imaging lens assembly provided in example 10 may achieve good image quality.

In view of the above, examples 1 to 10 respectively satisfy the relationship shown in Table 21.

TABLE 21

| Condition/Example | 1 | 2 | 3 | 4 | 5 | 6 | 7 | 8 | 9 | 10 |
|---|---|---|---|---|---|---|---|---|---|---|
| BFL/Td | 4.90 | 5.76 | 5.87 | 6.11 | 6.83 | 6.02 | 6.45 | 6.37 | 5.91 | 6.31 |
| \|V2 − V3\| | 39.80 | 39.80 | 39.80 | 39.80 | 39.80 | 39.80 | 39.80 | 39.80 | 39.80 | 39.80 |
| tan(FOV) | 0.20 | 0.20 | 0.20 | 0.20 | 0.17 | 0.19 | 0.20 | 0.20 | 0.16 | 0.20 |
| EPD/ImgH | 2.87 | 2.81 | 2.87 | 2.92 | 3.24 | 3.07 | 2.87 | 2.87 | 3.24 | 2.91 |
| DT11/DT32 | 1.12 | 1.02 | 1.03 | 1.05 | 0.98 | 1.10 | 0.92 | 0.96 | 1.01 | 0.95 |
| f2/f3 | −1.12 | −2.23 | −2.25 | −1.95 | −0.57 | −1.50 | −0.35 | −0.26 | −0.46 | −0.36 |
| f/\|f1\| | 0.86 | 0.03 | 0.03 | 0.19 | 0.66 | 0.48 | 0.04 | 0.06 | 0.08 | 0.07 |
| \|N2 − N3\| | 0.02 | 0.02 | 0.02 | 0.02 | 0.02 | 0.02 | 0.02 | 0.02 | 0.02 | 0.02 |
| R4/R5 | 0.10 | 0.26 | 0.26 | 0.24 | 1.80 | 0.31 | 1.85 | 2.14 | 3.81 | 1.97 |
| (T12 + T23)/Td | 0.42 | 0.41 | 0.39 | 0.39 | 0.73 | 0.41 | 0.63 | 0.70 | 0.57 | 0.64 |
| f/EPD | 3.54 | 3.54 | 3.54 | 3.54 | 3.61 | 3.54 | 3.54 | 3.54 | 3.90 | 3.54 |

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, consisting of a first lens, a second lens and a third lens sequentially from an object side to an image side of the optical imaging lens assembly along an optical axis, wherein:
the first lens having refractive power;
the second lens having refractive power; and
the third lens having refractive power,
wherein $4.5 \leq BFL/Td \leq 7.0$,
where BFL is a distance along the optical axis from an image-side surface of the third lens of the optical imaging lens assembly to an imaging plane of the optical imaging lens assembly, and Td is a distance along the optical axis from an object-side surface of the first lens to the image-side surface of the third lens: and
wherein $TAN(FOV)<0.4$,
where FOV is a maximum filed-of-view of the optical imaging lens assembly.

2. The optical imaging lens assembly according to claim 1, wherein $|V2-V3|>35$, where V2 is an Abbe number of the second lens, and V3 is an Abbe number of the third lens; and
wherein $|N2-N3|<0.1$, where N2 is a refractive index of the second lens, and N3 is a refractive index of the third lens.

3. The optical imaging lens assembly according to claim 1, wherein $2.5<EPD/ImgH<3.5$,
where EPD is an entrance pupil diameter of the optical imaging lens assembly, and ImgH is half of a diagonal length of an effective pixel area on the imaging plane of the optical imaging lens assembly.

4. The optical imaging lens assembly according to claim 1, wherein $0.9 \leq DT11/DT32 \leq 1.2$,
where DT11 is a maximum effective radius of the object-side surface of the first lens, and DT32 is a maximum effective radius of the image-side surface of the third lens.

5. The optical imaging lens assembly according to claim 1, wherein $-2.5<f2/f3<0$,
where f2 is an effective focal length of the second lens, and f3 is an effective focal length of the third lens.

6. The optical imaging lens assembly according to claim 1, wherein $f/|f1|<1.0$,
where f is a total effective focal length of the optical imaging lens assembly, and f1 is an effective focal length of the first lens.

7. The optical imaging lens assembly according to claim 1, wherein $0<R4/R5<4$,
where R4 is a radius of curvature of an image-side surface of the second lens, and R5 is a radius of curvature of an object-side surface of the third lens.

8. The optical imaging lens assembly according to claim 1, wherein $(T12+T23)/Td<1.0$,
where T12 is a spaced interval between the first lens and the second lens along the optical axis, T23 is a spaced interval between the second lens and the third lens along the optical axis, and Td is the distance along the optical axis from the object-side surface of the first lens to the image-side surface of the third lens.

9. The optical imaging lens assembly according to claim 1, wherein $3.0<f/EPD<4.5$,
where f is a total effective focal length of the optical imaging lens assembly, and EPD is an entrance pupil diameter of the optical imaging lens assembly.

10. The optical imaging lens assembly according to claim 1, wherein at least one of the first to the third lenses is a glass lens.

11. The optical imaging lens assembly according to claim 1, wherein the optical imaging lens assembly further includes a prism disposed between the image-side surface of the third lens and the imaging plane of the optical imaging lens assembly.

12. An optical imaging lens assembly, consisting of a first lens, a second lens and a third lens sequentially from an object side to an image side of the optical imaging lens assembly along an optical axis, wherein:
the first lens having refractive power;
the second lens having refractive power; and
the third lens having refractive power,
wherein $2.5<EPD/ImgH<3.5$,
where EPD is an entrance pupil diameter of the optical imaging lens assembly, and ImgH is half of a diagonal length of an effective pixel area on an imaging plane of the optical imaging lens assembly; and
wherein $TAN(FOV)<0.4$,
where FOV is a maximum field-of-view of the optical imaging lens assembly.

13. The optical imaging lens assembly according to claim 12, wherein $|V2-V3|>35$, where V2 is an Abbe number of the second lens, and V3 is an Abbe number of the third lens,
wherein $|N2-N3|<0.1$, where N2 is a refractive index of the second lens, and N3 is a refractive index of the third lens, and
wherein at least one of the first to the third lenses is a glass lens.

14. The optical imaging lens assembly according to claim 12,
wherein $3.0<f/EPD<4.5$, where f is a total effective focal length of the optical imaging lens assembly, and EPD is the entrance pupil diameter of the optical imaging lens assembly.

15. The optical imaging lens assembly according to claim 12, wherein $0.9 \leq DT11/DT32 \leq 1.2$,
where DT11 is a maximum effective radius of an object-side surface of the first lens, and DT32 is a maximum effective radius of an image-side surface of the third lens.

16. The optical imaging lens assembly according to claim 12, wherein $-2.5<f2/f3<0$,
where f2 is an effective focal length of the second lens, and f3 is an effective focal length of the third lens.

17. The optical imaging lens assembly according to claim 12, wherein $f/|f1|<1.0$,
where f is a total effective focal length of the optical imaging lens assembly, and f1 is an effective focal length of the first lens.

18. The optical imaging lens assembly according to claim 12, wherein $(T12+T23)/Td<1.0$,
where T12 is a spaced interval between the first lens and the second lens along the optical axis, T23 is a spaced interval between the second lens and the third lens along the optical axis, and Td is a distance along the optical axis from an object-side surface of the first lens to an image-side surface of the third lens.

19. The optical imaging lens assembly according to claim 12, wherein the optical imaging lens assembly further includes a prism disposed between an image-side surface of the third lens and the imaging plane of the optical imaging lens assembly.

* * * * *